US009875602B2

(12) United States Patent
Prabhu

(10) Patent No.: US 9,875,602 B2
(45) Date of Patent: Jan. 23, 2018

(54) ELECTRONIC GAMING MACHINE AND GAMING METHOD

(71) Applicant: Ainsworth Game Technology Limited, Newington (AU)

(72) Inventor: Sujay Prabhu, Newington (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 19 days.

(21) Appl. No.: 14/997,141

(22) Filed: Jan. 15, 2016

(65) Prior Publication Data

US 2017/0186267 A1 Jun. 29, 2017

(30) Foreign Application Priority Data

Dec. 23, 2015 (AU) ................................ 2015275296

(51) Int. Cl.
*G06F 17/00* (2006.01)
*G07F 17/32* (2006.01)
*G07F 17/34* (2006.01)

(52) U.S. Cl.
CPC ...... *G07F 17/3213* (2013.01); *G07F 17/3288* (2013.01); *G07F 17/34* (2013.01)

(58) Field of Classification Search
USPC ...................................................... 463/16–25
See application file for complete search history.

(56) References Cited

U.S. PATENT DOCUMENTS

| | | | | |
|---|---|---|---|---|
| 7,611,406 | B2 | 11/2009 | Fuller | |
| 7,654,895 | B2 | 2/2010 | Pacey | |
| 8,602,868 | B2 | 12/2013 | Johnson et al. | |
| 8,795,059 | B2 | 8/2014 | Aoki et al. | |
| 2008/0070672 | A1 | 3/2008 | Inamura | |
| 2015/0221176 | A1 * | 8/2015 | Meyer | G07F 17/34 463/20 |
| 2015/0228163 | A1 * | 8/2015 | Clarebrough | G07F 17/3244 463/20 |
| 2016/0104344 | A1 * | 4/2016 | Meyer | G07F 17/34 463/20 |

* cited by examiner

*Primary Examiner* — Ronald Laneau
(74) *Attorney, Agent, or Firm* — Cook Alex Ltd.

(57) ABSTRACT

The present invention provides an electronic gaming machine comprising a display for displaying a game. The game comprises game symbols and an array of first symbol positions in which the game symbols are able to be displayed and predetermined winning combinations of randomly selected game symbols award prizes to a player. An electronic game controller controls the display of the game symbols on the display and randomly determines whether to display one of the game symbols in each first symbol position. In response to each first symbol position in the array displaying a game symbol, the electronic game controller causes the display of one or more second symbol positions in addition to the first symbol positions and randomly determines whether to display a game symbol in each of the one or more second symbol positions.

26 Claims, 24 Drawing Sheets

ELECTRONIC GAMING MACHINE AND GAMING METHOD

BACKGROUND

The present invention relates to an electronic gaming machine and in a particular an electronic gaming machine using a base game and a feature game. The invention has been developed primarily for use as an electronic gaming machine and will be described hereinafter by reference to this application.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

In an electronic gaming machine, the mechanical reels are replaced with video images of the reels, which are displayed on a video display screen. The electronic gaming machine has an internal electronic game controller, typically a computer, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played.

Bonus or "feature" games may also be provided by an electronic gaming machine in addition to a base or main game. Typically feature games use the same set of reels as the main game and are limited to a set of free games operated under a single set of rules. This means that the feature game is restricted by the same set of rules, and so there is no variation in the play of the feature game.

Also, electronic gaming machines can offer one or more bonus prizes to the player during play of the game. The most common type of bonus prize that is awarded by the electronic gaming machine is a jackpot prize, the main example of which is a progressive jackpot prize.

This standard structure to game play and bonus prizes limits the variation in the play of the electronic gaming machine. Consequently, it is difficult to retain player interest because there is no apparent incentive for the player to continue playing the same electronic gaming machine once the player becomes familiar with the feature game, the main game and any bonus prizes. Also, it is difficult to retain player interest since there is little differentiation between gaming machines in terms of the main and feature games that are played.

This problem is exacerbated when more than one game is offered to play on the same electronic gaming machine. The option to play different games on a single machine is attractive to the player as there is no need to keep switching machines to play a different game. While this introduces some variation in game play due to different games being provided on the electronic gaming machine, the bonus prizes are often the same across the offered games.

It is an object of the present invention to overcome or substantially ameliorate one or more of the disadvantages of prior art, or at least to provide a useful alternative.

SUMMARY

According to a first aspect of the invention, there is provided an electronic gaming machine comprising:

a display for displaying a game, wherein said game comprises game symbols and predetermined winning combinations of randomly selected game symbols award prizes to a player; and an electronic game controller for controlling the display of said game symbols on the display;

wherein said game further comprises an array of first symbol positions in which said game symbols are able to be displayed and said electronic game controller randomly determines whether to display one of said game symbols in each first symbol position; and wherein, in response to each first symbol position in said array displaying a game symbol, said electronic game controller causes the display of one or more second symbol positions in addition to said first symbol positions and randomly determines whether to display a game symbol in each of said one or more second symbol positions.

According to a second aspect of the invention, there is provided an electronic gaming machine comprising:

a display for displaying a game, wherein said game comprises game symbols and predetermined winning combinations of randomly selected game symbols award prizes to a player;

an electronic game controller for controlling the display of said game symbols on the display; and a value transfer mechanism for receiving value from said player to initiate a play of said game;

wherein said game further comprises an array of first symbol positions in which said game symbols are able to be displayed and said electronic game controller randomly determines whether to display one of said game symbols in each first symbol position; and wherein, in response to each first symbol position in said array displaying a game symbol, said electronic game controller causes the display of one or more second symbol positions in addition to said first symbol positions and randomly determines whether to display a game symbol in each of said one or more second symbol positions.

According to a third aspect of the invention, there is provided a gaming method for an electronic gaming machine comprising a display and an electronic game controller, the method comprising the steps of:

controllably displaying game symbols for playing a game, wherein said game comprises game symbols and predetermined winning combinations of randomly selected game symbols award prizes to a player;

displaying an array of first symbol positions in which said game symbols are able to be displayed;

randomly determining whether to display one of said game symbols in each first symbol position;

in response to each first symbol position in said array displaying a game symbol, displaying one or more second symbol positions in addition to said first symbol positions; and randomly determining whether to display a game symbol in each of said one or more second symbol positions.

A fourth aspect of the present invention provides a gaming method for an electronic gaming machine comprising a display for displaying a game; an electronic game controller for controlling the display of said game symbols for playing said game on said display; and a value transfer mechanism for receiving value from said player to initiate a play of said game, the method comprising:

controllably displaying game symbols for playing a game, wherein said game comprises game symbols and predetermined winning combinations of randomly selected game symbols award prizes to a player;

displaying an array of first symbol positions in which said game symbols are able to be displayed;

randomly determining whether to display one of said game symbols in each first symbol position;

in response to each first symbol position in said array displaying a game symbol, displaying one or more second symbol positions in addition to said first symbol positions; and randomly determining whether to display a game symbol in each of said one or more second symbol positions.

According to a fifth aspect of the invention, there is provided a computer system comprising a central processing unit configured for communication with an electronic gaming machine, wherein said computer system is configured to perform the method of the third or fourth aspects of the invention.

According to a sixth aspect of the invention, there is provided a computer programme configured to perform the method of the third or fourth aspects of the invention.

According to a seventh aspect of the invention, there is provided a non-transitory carrier medium carrying computer executable code that, when executed on a central processing unit configured for communication with an electronic gaming machine, causes the central processing unit to perform the method of the third or fourth aspects of the invention.

Throughout the specification and unless explicitly stated otherwise, the term "value" means credits, gaming tokens, coins, paper, currency, tickets, vouchers, credit cards, debit cards, smart cards, memory devices capable of storing value and any other object representative of value.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

DETAILED DESCRIPTION OF VARIOUS EMBODIMENTS

Figure 1:
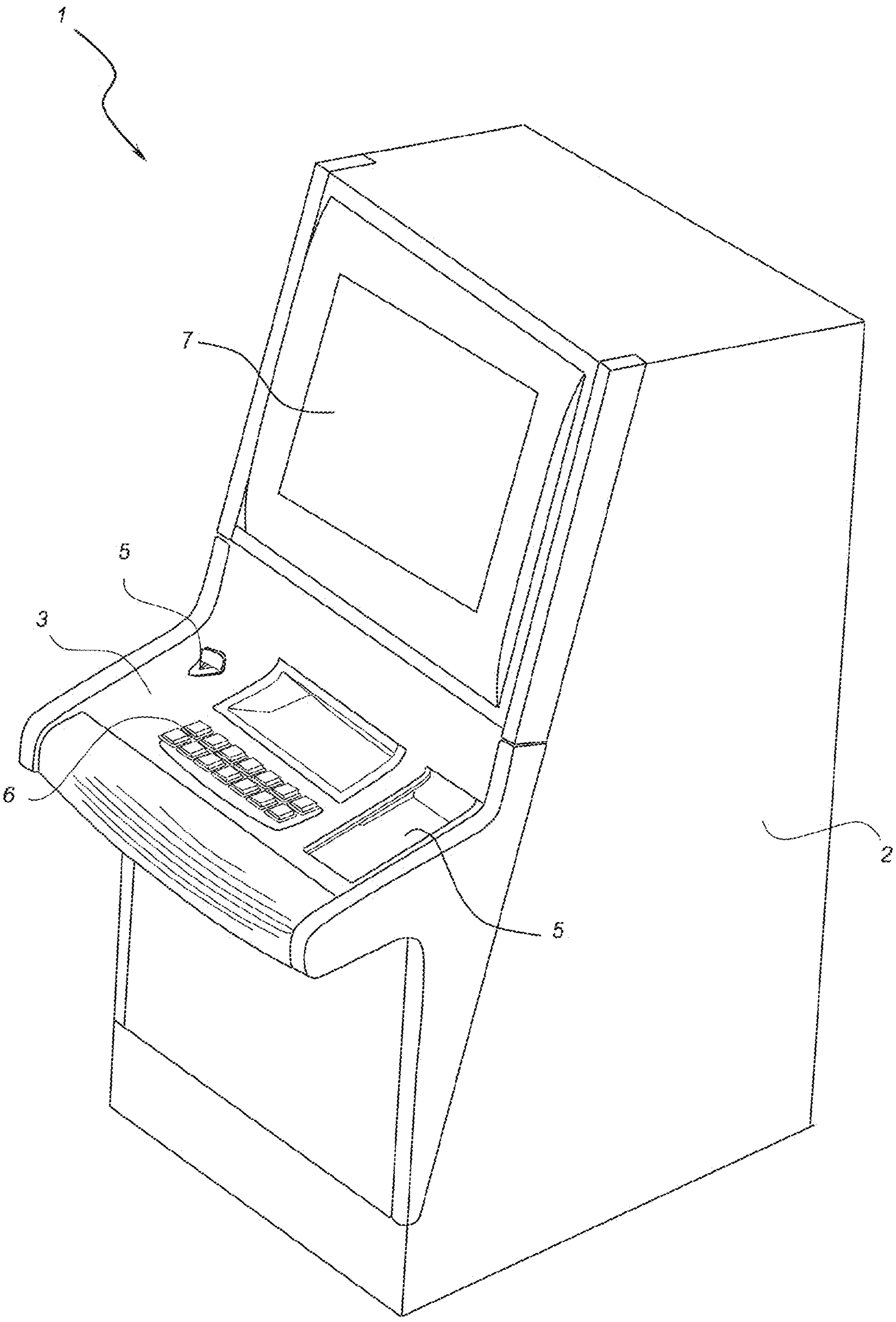
FIG. 1 is a perspective view of an electronic gaming machine according to an embodiment of the invention.

The present invention will now be described with reference to the following examples which should be considered in all respects as illustrative and non-restrictive. In the Figures, corresponding features within the same embodiment or common to different embodiments have been given the same reference numerals.

Referring to FIG. 1, an electronic gaming machine 1 according to a first embodiment of the invention includes a cabinet 2, a console 3 and an internal electronic game controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device. Typically, the memory device is a credit card, debit card or other card that enables the transfer of monetary credit to the electronic gaming machine 1. Other forms of value include gaming tokens, paper, tickets, vouchers, and any other object representative of value.

Figure 2:
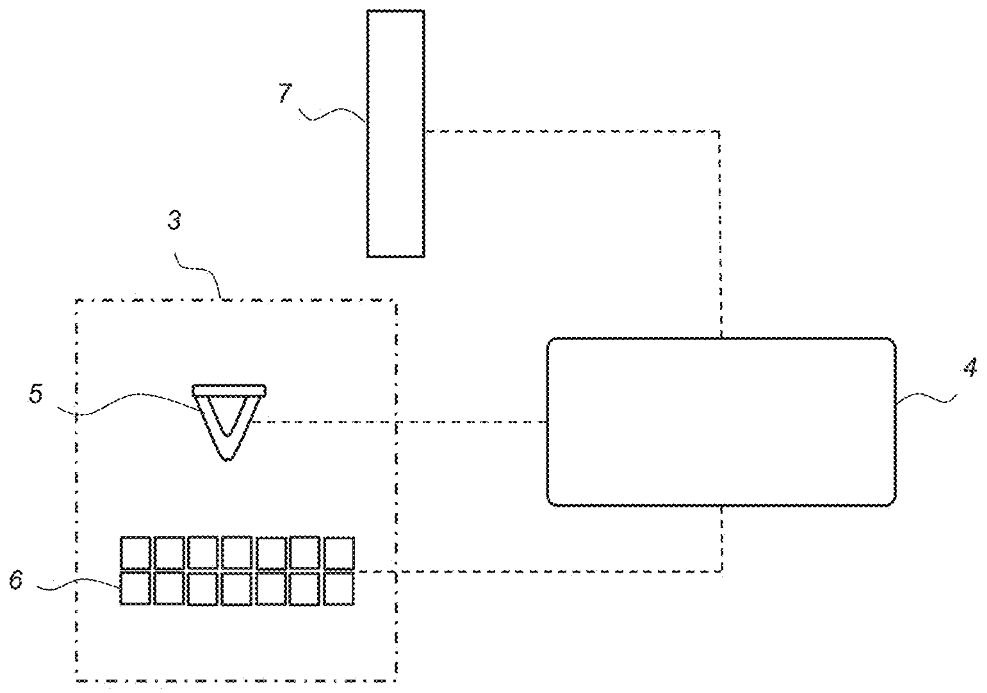
FIG. 2 is a schematic drawing of an electronic game controller for the electronic gaming machine of FIG. 1.

The electronic game controller 4 is generally in the form of a central processing unit, such as a computer, and is in electronic communication with a display in the form of a video display screen 7, as well as various input devices on the console 3, as best shown in FIG. 2. Typically, the electronic game controller 4 also comprises a random access memory (RAM) associated with the central processing unit, the RAM being used to store programme instructions and transient data related to the operation of the electronic game controller and hence the electronic gaming machine 1. The RAM contains a body of program instructions for implementing a game on the electronic gaming machine 1, as discussed in more detail below. The central processing unit or processor may also be operatively associated with a further storage device, such as a hard disk drive, which is used for long-term storage of program components and data relating to the electronic game controller 4 and/or the electronic gaming machine 1, including a database for game performance data, as well as information gathered from users. It is also appreciated that a person skilled in the art would readily understand the location and use of the electronic game controller 4 in the electronic gaming machine 1.

The electronic game controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic game controller 4, which then determines whether the minimum bet level has been reached. If so, the electronic game controller 4 will permits play of the game on the electronic gaming machine 1. If not, the electronic game controller 4 will send a signal to the display 7 to show a message requesting further value to be added to the electronic gaming machine 1.

Figure 3:
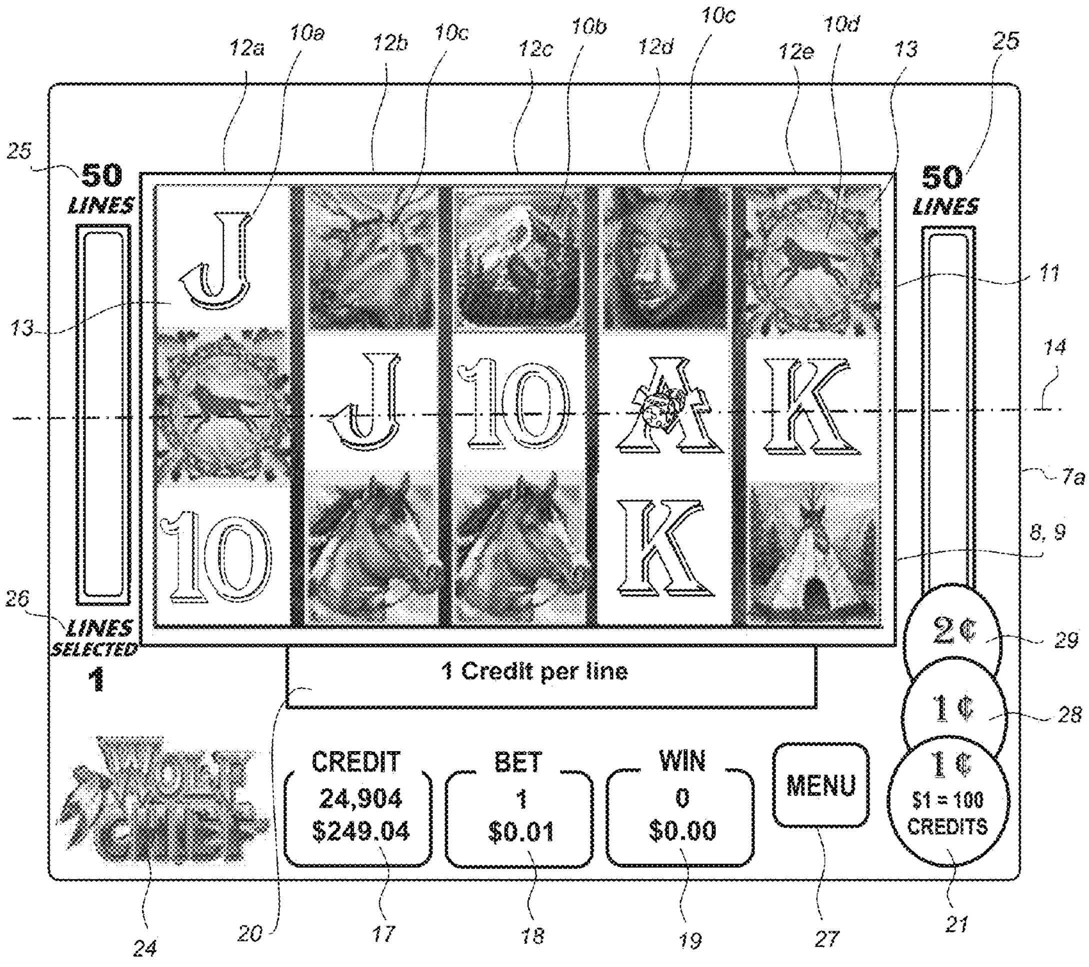
FIG. 3 is a simulated screen shot illustrating a game played on the electronic gaming machine of FIG. 1.

The electronic game controller 4 is programmed to provide a game in the form of a base game 8 (as best shown in FIG. 3) and a feature game 9 on a lower playing area 7*a* of the display 7 of the electronic gaming machine 1 for play by a player. The base game 8 has game symbols 10 arranged into an array 11 in the form of five columns or "reels" 12. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic game controller 4 will transmit signals to the display screen 7 to cause the base game 8 and feature game 9 to be played on the lower playing area 7*a*, including showing the game symbols 10, array 11 and other visible elements of the games.

The array 11 of the base game 8 defines predetermined game or symbol positions 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or game positions) or other markings to define each respective area of the symbol positions.

The array 11 is arranged so that a player can select one or more predetermined "pay lines" 14 defined around the array, which correspond to combinations of the symbol or game positions 13. The pay lines 14 correspond to the lines selected by the player and generally comprise at least one game position or symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols. Those skilled in the art will readily understand that a substitute symbol is able to act as any other game symbol, and hence is also known as a "wild card" or "wild" symbol. Likewise, those skilled in the art will readily understand that a scatter symbol is a symbol that triggers a game event or confers an award without having to appear on a player-selected pay line 14. Similarly, a trigger symbol is a symbol that triggers a game event (like activating a feature game) or confers an award, where the trigger symbol may or may not have to appear in combination and may or may not have to appear on the same player-selected pay line 14. In this embodiment, the game symbols 10 include playing card symbols 10*a*, item-themed symbols 10*b*, animal-themed symbols 10*c*, substitute or wild card symbols in the form of wolf image symbol 10*d* and a scatter symbol in the form of a horse symbol 10*e*. The electronic game controller 4 randomly determines the appearance of the game symbols 10 on the array 11.

The lower playing area 7*a* of the video screen 7 also displays other standard game information including the amount of player credits 17, the amount of the current bet wagered by the player 18, the amount of wins by the player 19, a message area 20, a current denomination button 21 indicating the currently selected base bet denomination, the name 24 of the game "Wolf Chief" being played. Other standard information includes the number of pay lines available 25, the number of player-selected pay lines 26 and a menu button for bringing up a menu screen 27 (typically explaining the game rules and showing the available pay lines 14).

In the base game 8, the player initially makes a bet using vending slots 5 to initiate play of the electronic gaming machine 1 by building up credit to play the base game 8 on the electronic gaming machine. For example, the player can bet or wager monetary amounts equivalent to a particular amount of credits, depending on the bet denomination selected for the base game. Also, the player can make any additional side bets or ante-bets during play of the base game 8 once the base game has commenced to access additional features in the base game, such as increasing the number of winning combinations in the base game.

Typically, electronic gaming machines offer a number of preset bet options that the player can make, and these bet options can vary depending on the game or games offered on the electronic gaming machine. For example, a game on an electronic gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

The electronic gaming machine 1 also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the electronic gaming machine has not yet been played or has been started up, the default bet denomination is initially selected by the electronic game controller 4. The default bet denomination can be randomly selected or chosen according to a predetermined order. Usually, the electronic game controller 4 will select the lowest bet denomination that is available for the base game 8, which would be the 1¢ bet denomination for this embodiment. The player may change the bet denomination at any time in the base game 8 by touching the denomination button 21 before or after the reels 12 have spun. In this embodiment, touching the denomination button 21 will bring denomination images 28, 29 that the player may select to quickly change the bet denomination between plays of the game 8.

The video display screen 7 may also include an upper display area, either as a separate display or integrated into the display screen 7, which provides jackpot information relating to available jackpots or bonus prizes in the game 8. In this embodiment, there are tiered jackpots of increasing worth, comprising a Minor jackpot, a Mini jackpot and a Major jackpot. The upper display area ensures that the jackpot information is available to the player at all times during play of the electronic gaming machine 1.

Once the player has commenced play of the game 8 by making an appropriate bet, the electronic game controller 4 then transmits a signal to the display 7 to make reels 12 to appear to visibly rotate or "spin" in a linear path, typically in a downward vertical direction, and randomly display the game symbols 10 in each symbol position 13 for each play of the array 11 for the base game 8. After the reels 12 stop spinning, the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 9 can also be provided. If so, the gaming machine 1 enters a winning game state and awards a prize according to the displayed predetermined winning combination.

The electronic game controller 4 also determines whether the feature game 9 should be activated, based on a predetermined trigger event, such as the appearance of three scatter symbols 10*e* appearing in a play or spin of the base game 8. The scatter symbols 10*e* need not appear on the same pay line 14, but can appear on any of the player-selected pay lines.

The electronic game controller 4 then transmits a signal to the video screen 7 to cause the feature game 9 to appear on the video screen 7. The feature game 9 also uses the same game symbols 10 as the base game 8, as well as the same array 11, reels 12*a* to 12*e*, symbol positions 13 and player-selectable pay lines 14 on the video screen 7. As such, the feature game 9 appears visually the same as the base game 8, and so is also effectively illustrated by FIG. 3. In the feature game 9, ten free plays or spins of the feature game are awarded to the player without having to make an additional bet or wager. It will be understood by those skilled in the art that a free play or spin involves a play of the game without requiring any bet to be made by the player, and that any number of free spins can be chosen for the feature game. In addition, it will be appreciated that in the art free plays or spins are commonly referred to as "free games". The number of free games remaining in the feature game 9 may be indicated by a counter shown near the array 11 on the screen 7. Typically, the prizes awarded for the same winning combinations of game symbols in the feature game 9 are of higher worth than the prizes awarded in the base game 8.

Figure 4:
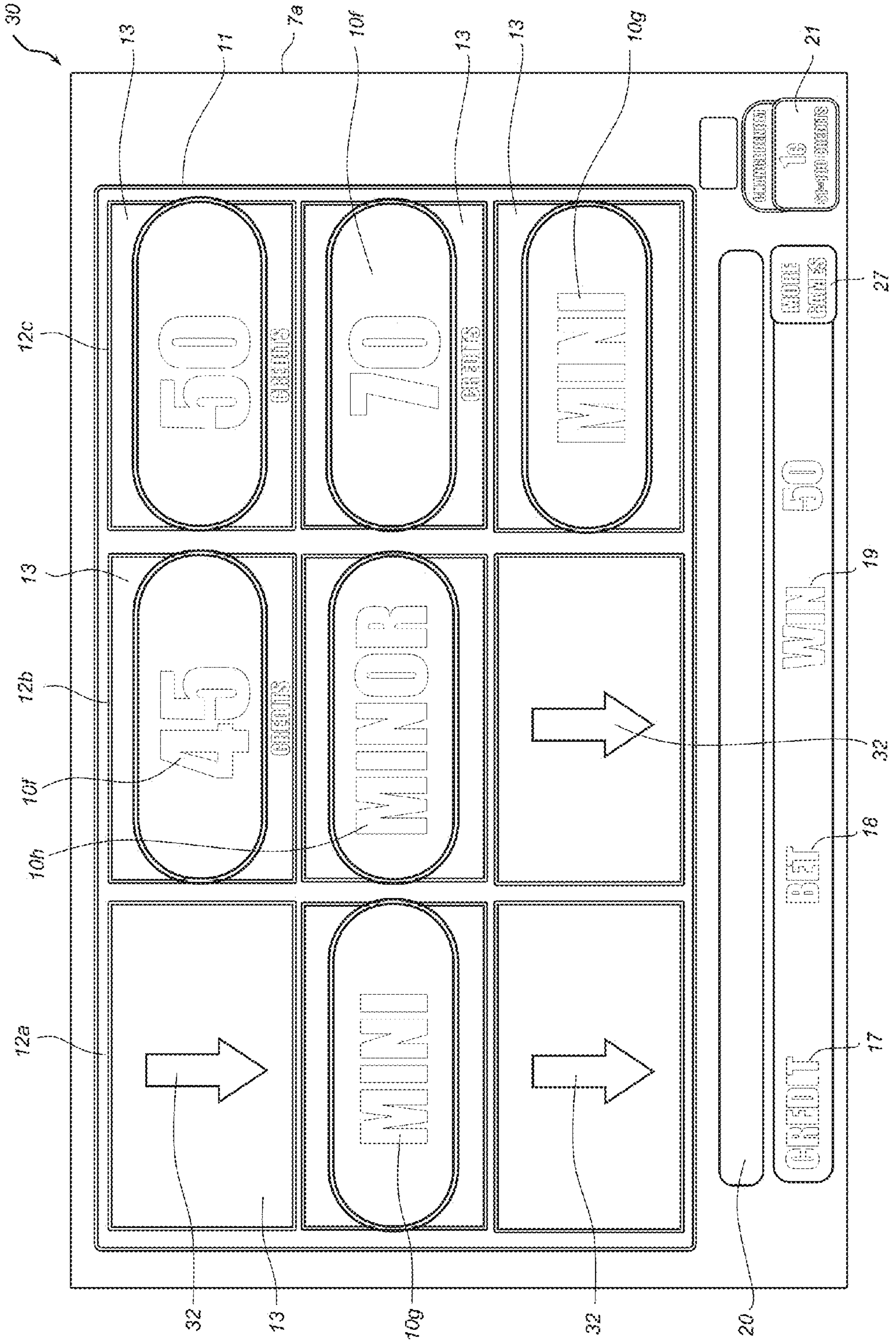
FIG. 4 is a partial simulated screen shot illustrating another game played on the electronic gaming machine of FIG. 1.

Referring to FIG. 4, another base game 30 played on the electronic gaming machine 1 is partly illustrated, where extraneous features, such as standard game information relating to the number of pay lines available 25 and the number of player-selected pay lines 26, have been removed for the purposes of clarity. In this embodiment, the array 11 is a 3×3 array, with each symbol position 13 comprising its own individual reel and three of the reels are grouped into columns 12*a* to 12*c* of reels. That is, each symbol position 13 has its own individual reel strip of game symbols. In other embodiments, the symbol positions 13 are not individual reels but are grouped to form three reels 12*a* to 12*c*, where the same reel strip is used to randomly select and display game symbols of each reel 12*a* to 12*c*. The reel strips for the game 30 do not have a game symbol 10*g* to 10*h* for each position of the reel strip, but instead have empty positions or "blanks" that do not show any game symbol. Alternatively, there are null symbols or terminator symbols in the reel strips that cannot form part of any winning combination of symbols but simply act to end the base game 30.

Figure 5:
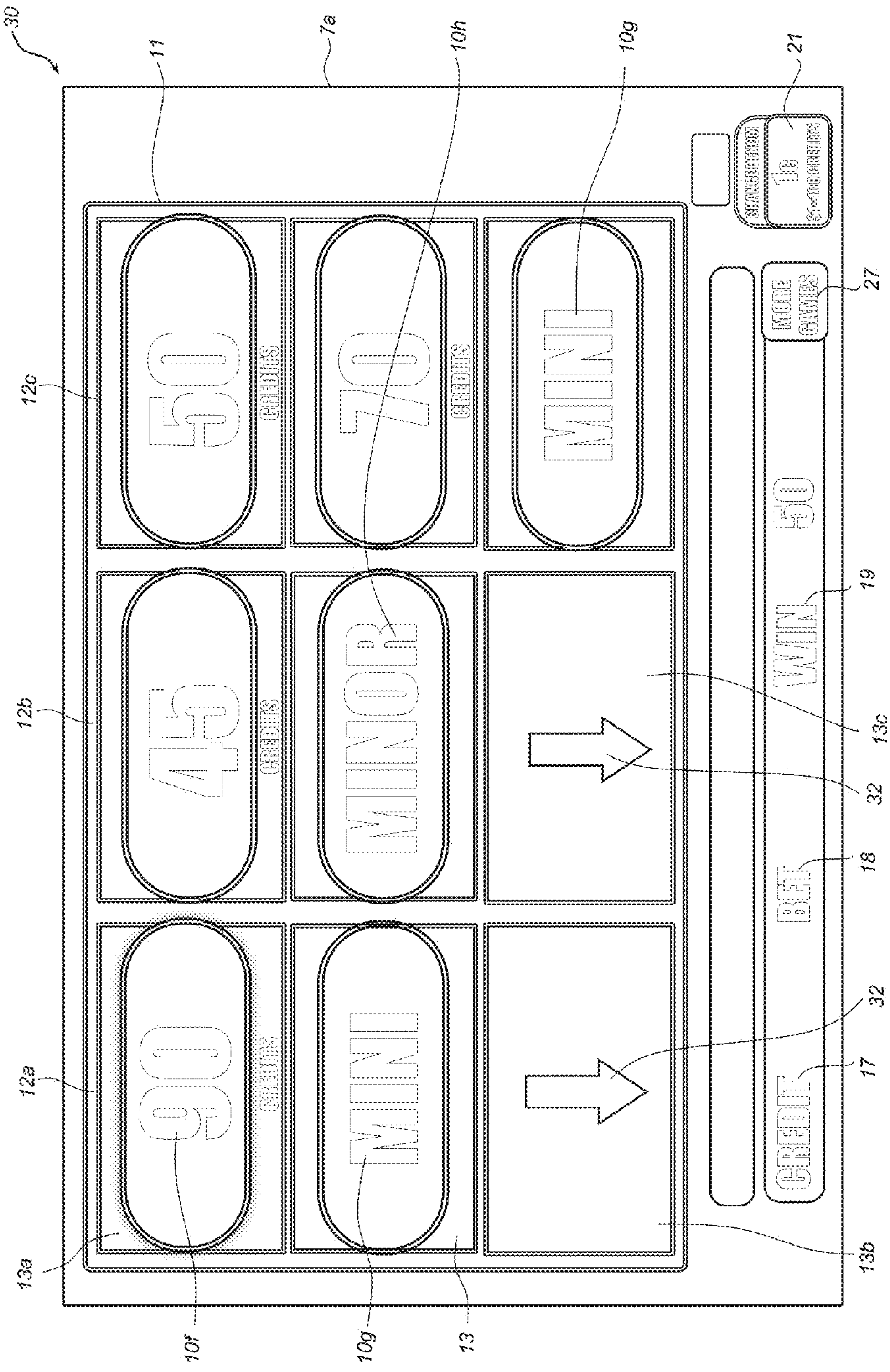
FIG. 5 is a partial simulated screen shot illustrating the game of FIG. 4.
Figure 6:
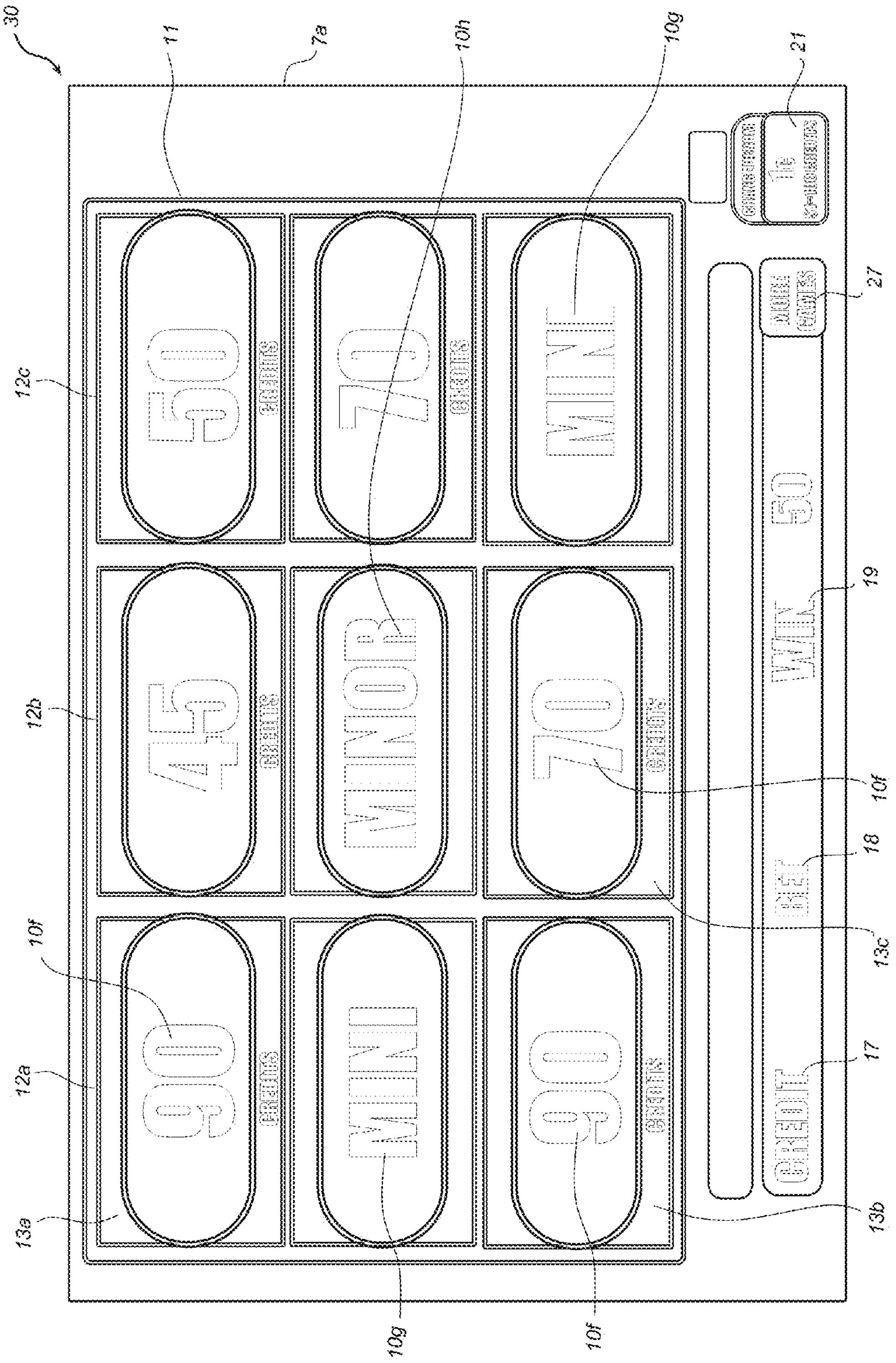
FIG. 6 is a partial simulated screen shot illustrating the game of FIG. 4.

In FIG. 4, the reels in the symbol positions 13 spin at different rates so that some symbol positions 13 display the result of the spin of their reels (displaying game symbols 10*f*, 10*g*, 10*h* or an empty position) while other symbol positions are still spinning as indicated schematically by arrows 32. In FIG. 5, the reel in the symbol position 13*a* has stopped spinning to show a "90 credits" game symbol 10*f* while two remaining reels in symbol positions 13*b* and 13*c* remain spinning. In FIG. 6, the last two reels in symbol positions 13*b* and 13*c* have stopped to display "90 credits" and "70 credits" game symbols 10*f* in their respective positions. While in FIGS. 4 to 6, a game symbol 10*f* to 10*h* has been displayed in each of the symbol positions 13, it is possible through random selection by the electronic game controller 4 that one or more of the symbol positions 13 are left vacant.

If one of the symbol positions 13 did not display a game symbol 10*f* to 10*h*, then the base game 30 ends and the player has to make another bet to commence play of the base game 30 and spin each reel in the symbol positions 13 in the array 11. However, the player is awarded prizes based on any winning combinations of game symbols 10*f* to 10*h* that are displayed in the symbol positions 13 in the array before the base game 30 ends. In this embodiment, the winning combinations are the accumulated game symbols 10*f* that have numerical values and any three of a kind of the MINI game symbol 10*g* and MINOR game symbol 10*h*. For example, if the last two remaining reels did not display a game symbol 10*f* to 10*h* in their respective symbol positions 13*b*, 13*c* as shown in FIG. 5, then the player would only receive a prize of 255 credits (being the sum of the displayed credit game symbols 10f, being on of 45, 50, 70 and 90 credits) and not the MINI or MINOR bonus prize as there are not three of a kind of each symbol displayed.

Figure 7:
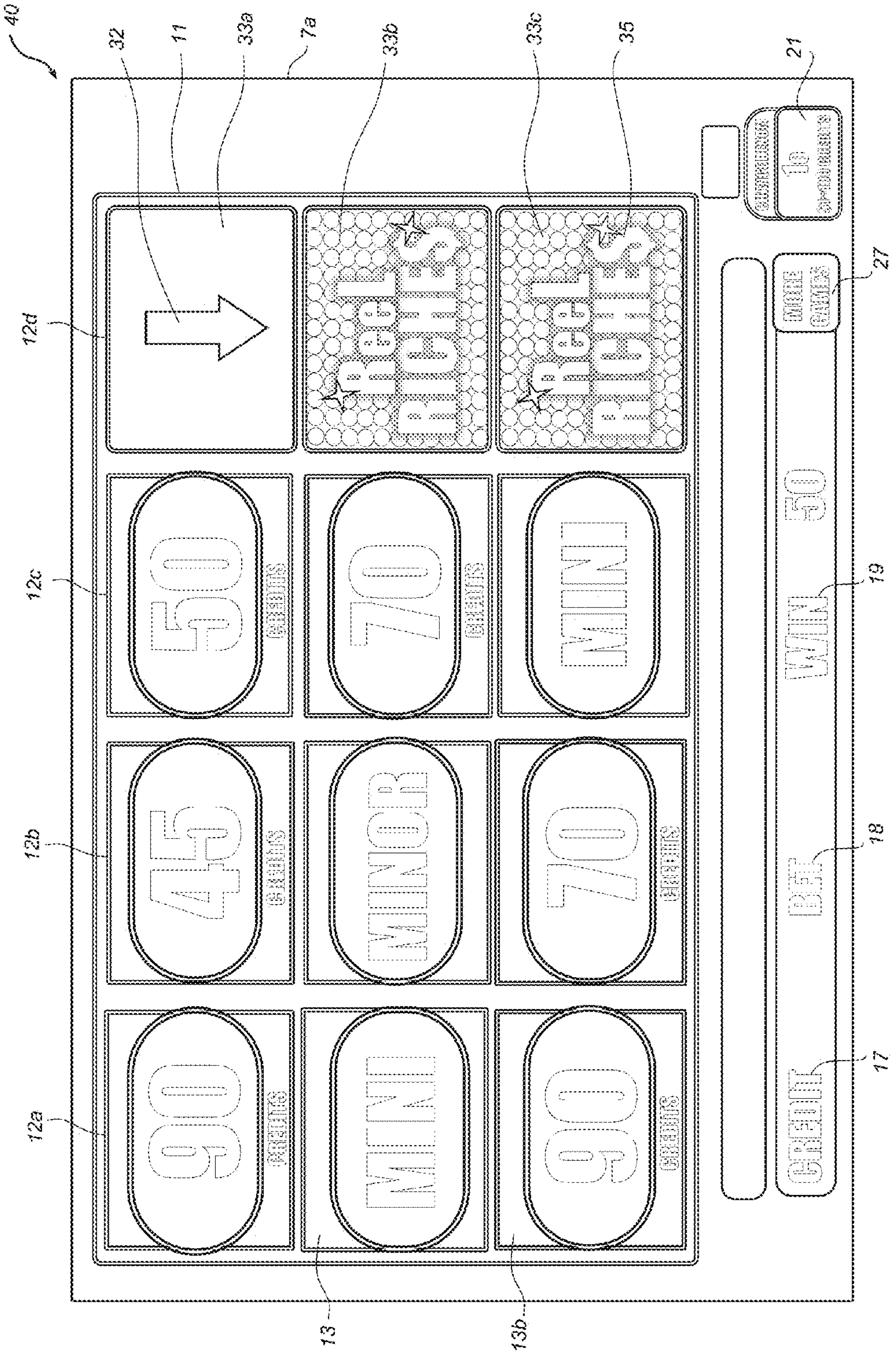
FIG. 7 is a partial simulated screen shot illustrating a further game played on the electronic gaming machine of FIG. 1.

The display of a game symbol 10f to 10h in each symbol position 13 of the array 11 is a trigger event that causes the display of a feature game 40, as best shown in FIG. 7. In addition, the player is not yet awarded a prize based on the displayed game symbols 10f to 10h in the array 11. Instead, the award of the prize is delayed until later in the game, as discussed in more detail below.

Figure 8:
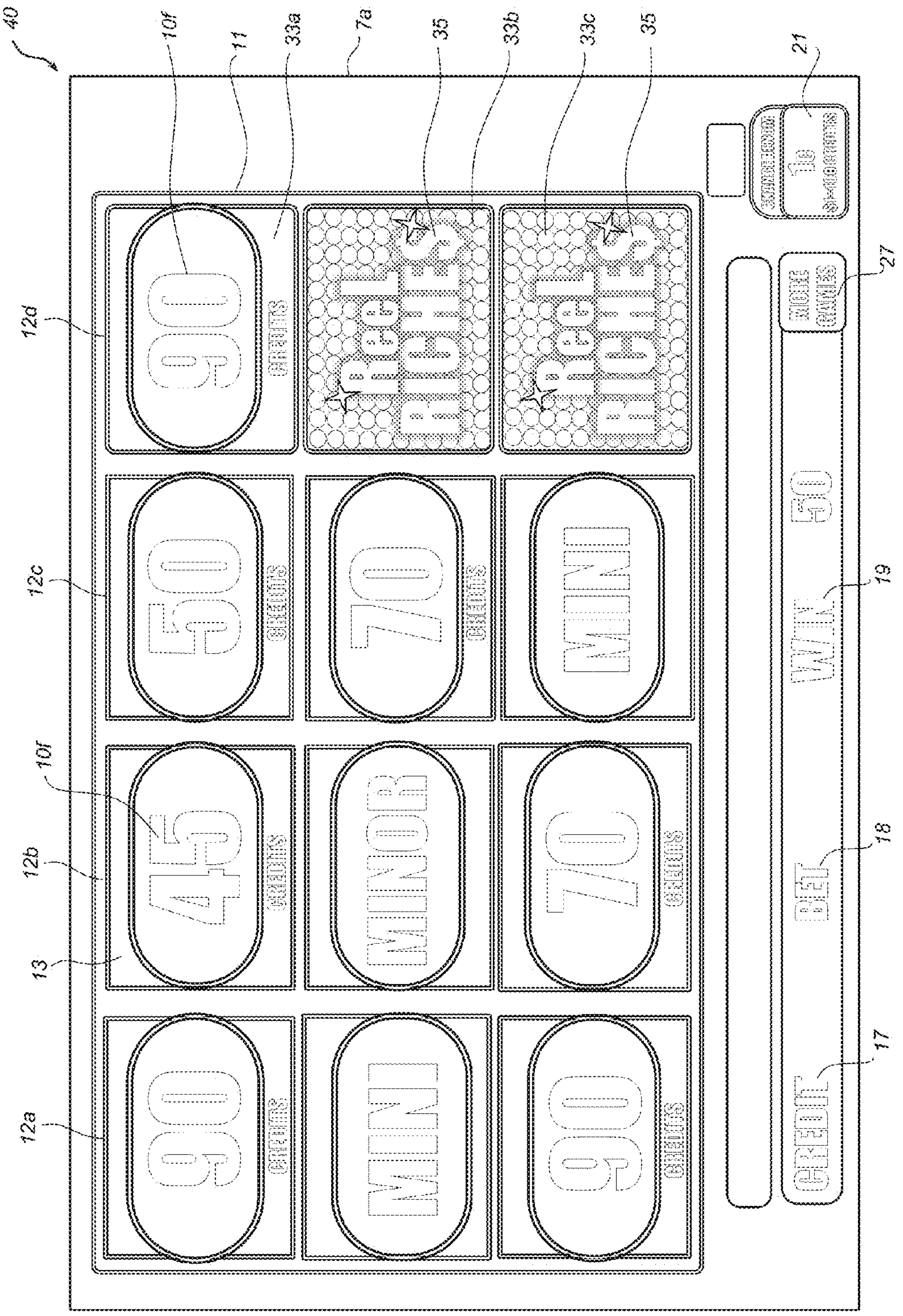
FIG. 8 is a partial simulated screen shot illustrating the game of FIG. 7.
Figure 9:
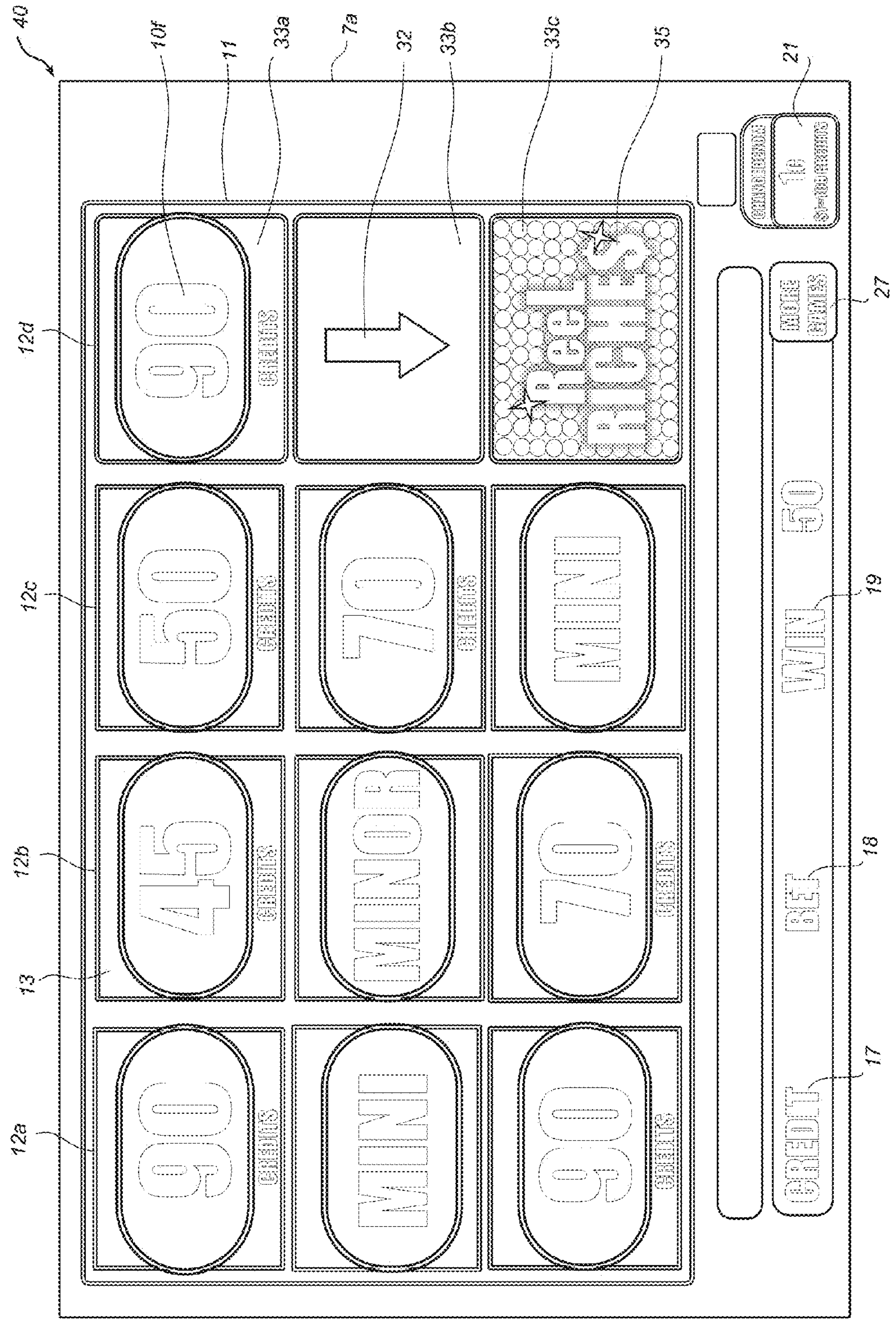
FIG. 9 is a partial simulated screen shot illustrating the game of FIG. 7.
Figure 10:
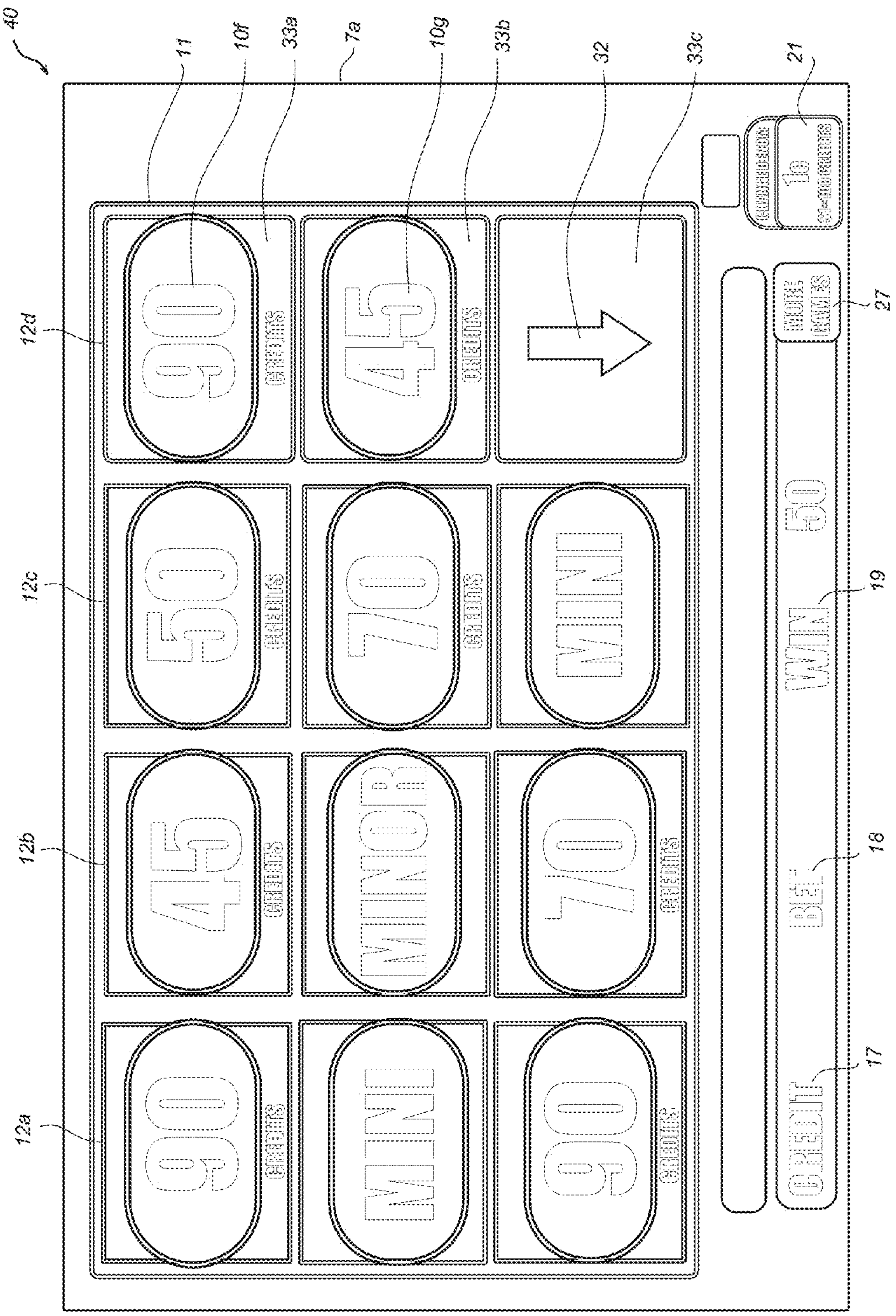
FIG. 10 is a partial simulated screen shot illustrating the game of FIG. 7.
Figure 11:
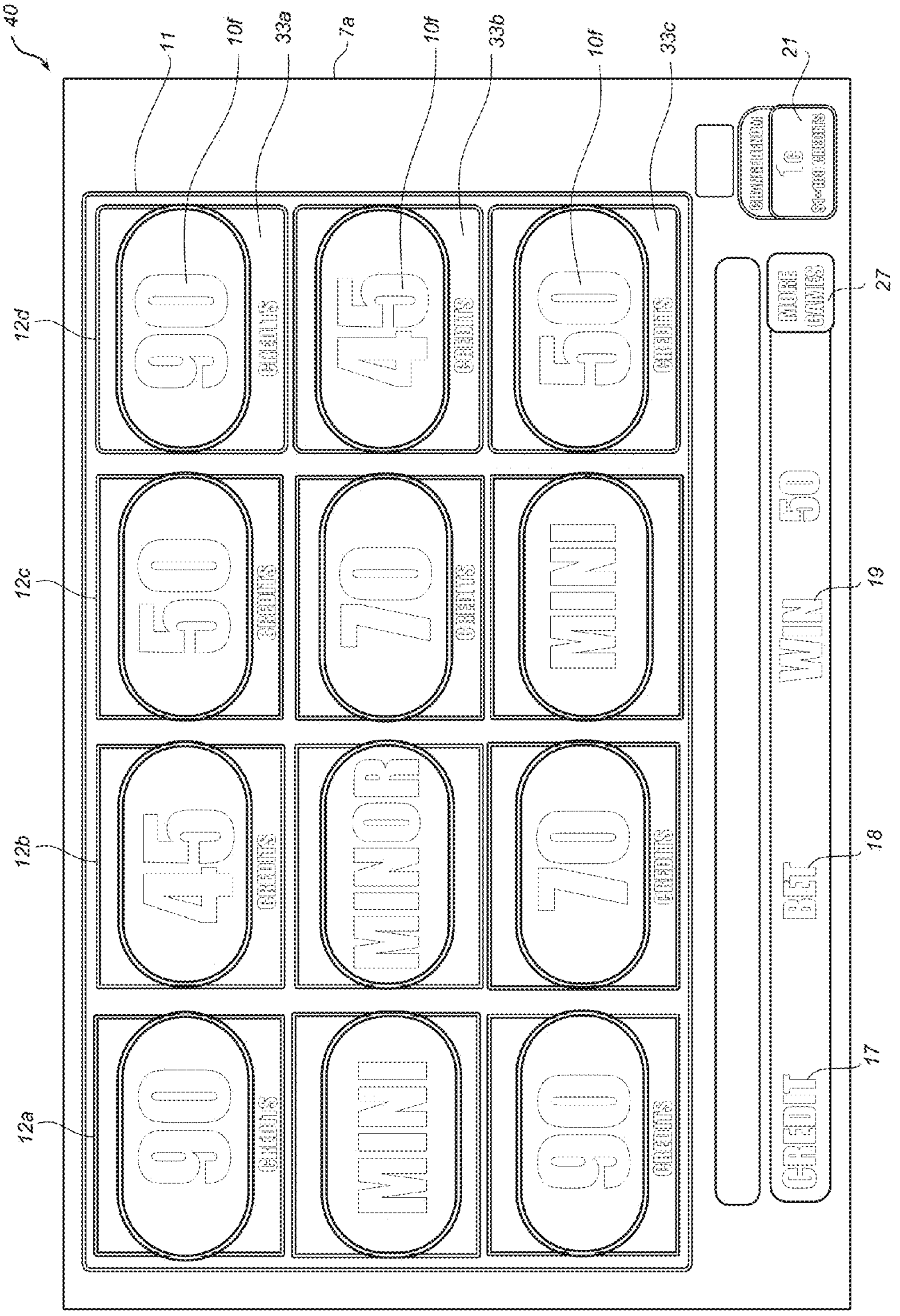
FIG. 11 is a partial simulated screen shot illustrating the game of FIG. 7.

In the feature game 40, the columns 12a to 12c of reels are held static (in the sense that the reels in symbol positions 13 do not spin and the game symbols 10f to 10h remain displayed in the symbol positions 13) and another column 12d of reels is displayed so as to extend the array 11 to be a 4×3 array. The column 12d of reels comprises symbol positions 33 that are in addition to the existing symbol positions 13 in the array 11. The symbol positions 33 have their own individual reels that spin sequentially (i.e. one after the other), beginning from the top symbol position 33a. As can be seen, the top symbol position 33a has its reel spinning as indicated by arrow 32 while the two symbol positions 33b, 33c have not yet spun and are displaying non-game image symbols 35 (in this case, showing an image of the name of the game, being "Reel Riches"). Once the reel in the top symbol position 33a completes its spin, as best shown in FIG. 8, the next reel in the middle symbol position 33b commences its spin, as best shown in FIG. 9. The bottom symbol position 33c does not spin but displays the non-game image symbol 35. Once the middle symbol position 33b completes its spin, as best shown in FIG. 10, the next reel in the bottom symbol position 33c commences its spin. Finally, the last reel in the bottom symbol position 33c ends its spin, as best shown in FIG. 11.

As described above, as each symbol position 33 spins, the electronic game controller 4 randomly determines whether a game symbol 10f to 10h is to be displayed in that symbol position 33. Where the electronic game controller 4 randomly determines that a game symbol 10f to 10h should not be displayed in one or more of the symbol positions 33, then that symbol position 33 remains empty or left vacant.

If one of the symbol positions 33a to 33c does not display a game symbol 10f to 10h, then the feature game 40 ends and the electronic gaming machine 1 resets to display the base game 30. The player now has to make another bet to commence play of the base game 30 and spin each reel in the symbol positions 13 in the array 11. However, the player is awarded prizes based on any winning combinations of game symbols 10f to 10h that are displayed in the symbol positions 13, 33 in the array 11 before the feature game 40 ends. For example, if the last two remaining reel in the symbol position 33c did not display a game symbol 10f to 10h as shown in FIG. 10, then the player would only receive a prize of 390 credits (being the sum of the displayed credit game symbols 10f in the symbol positions 13, 33) and not the MINI or MINOR bonus prize as there are not three of a kind of each symbol displayed.

Figure 12:
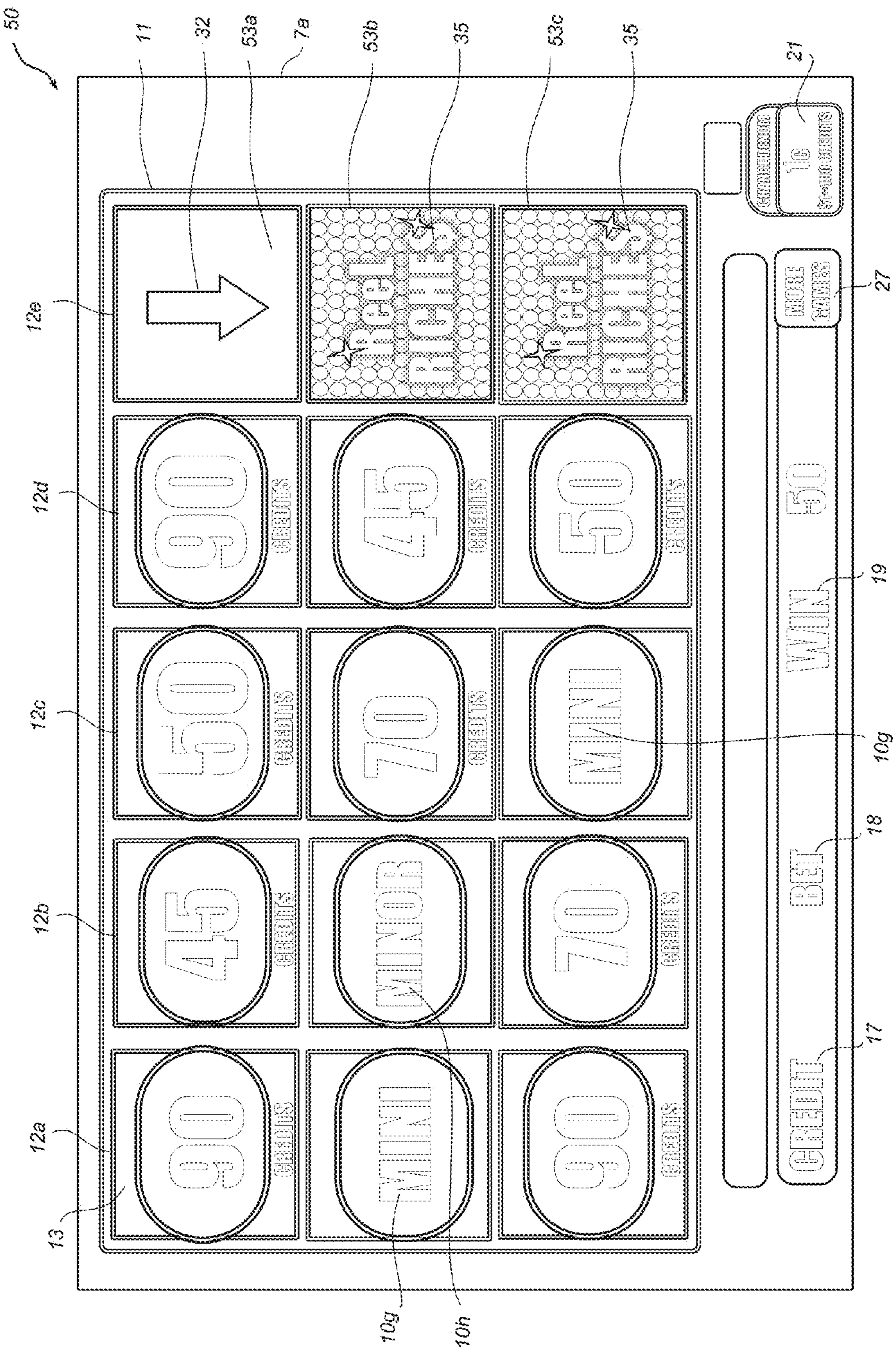
FIG. 12 is a partial simulated screen shot illustrating yet another game played on the electronic gaming machine of FIG. 1.
Figure 13:
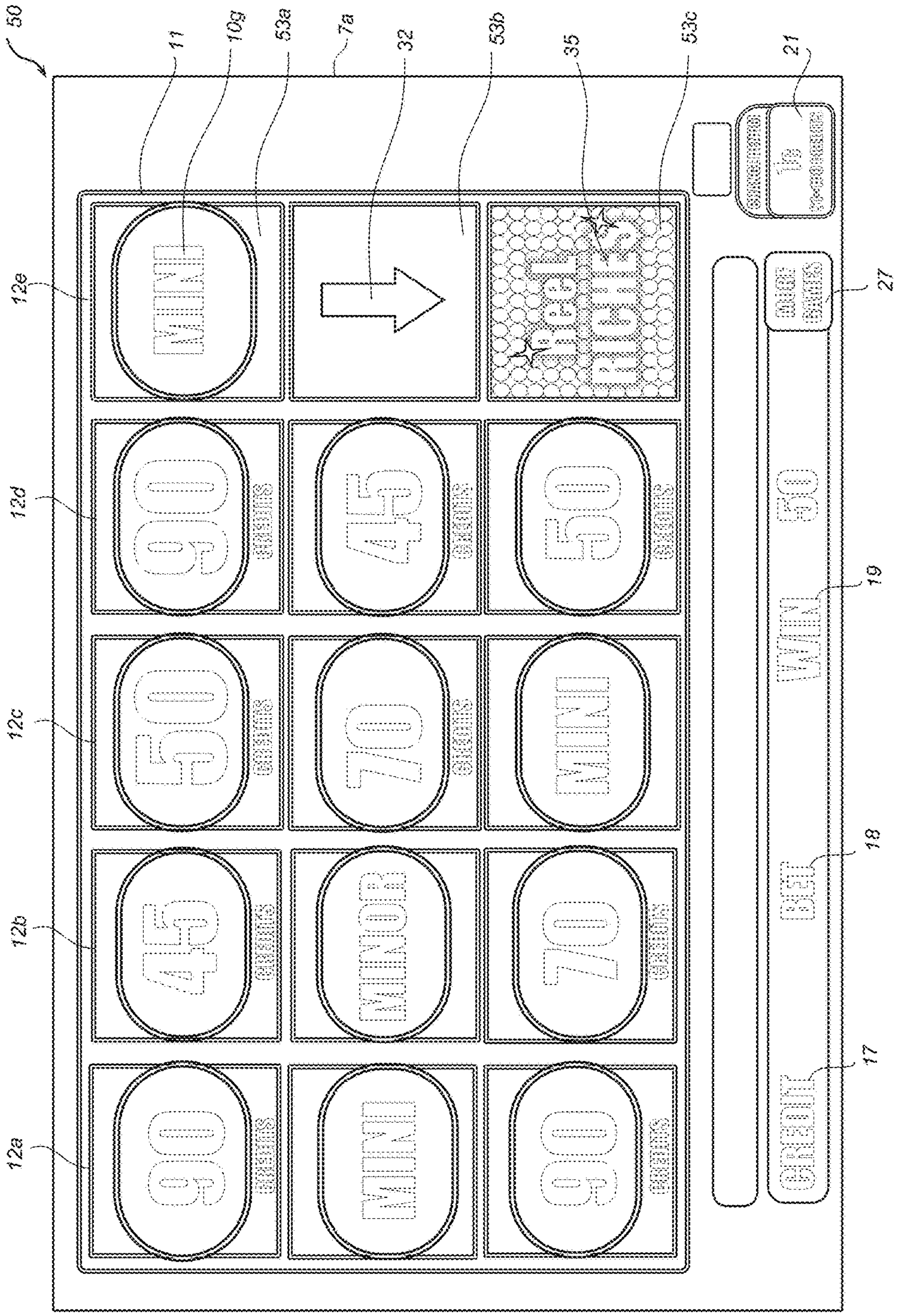
FIG. 13 is a partial simulated screen shot illustrating the game of FIG. 12.
Figure 14:
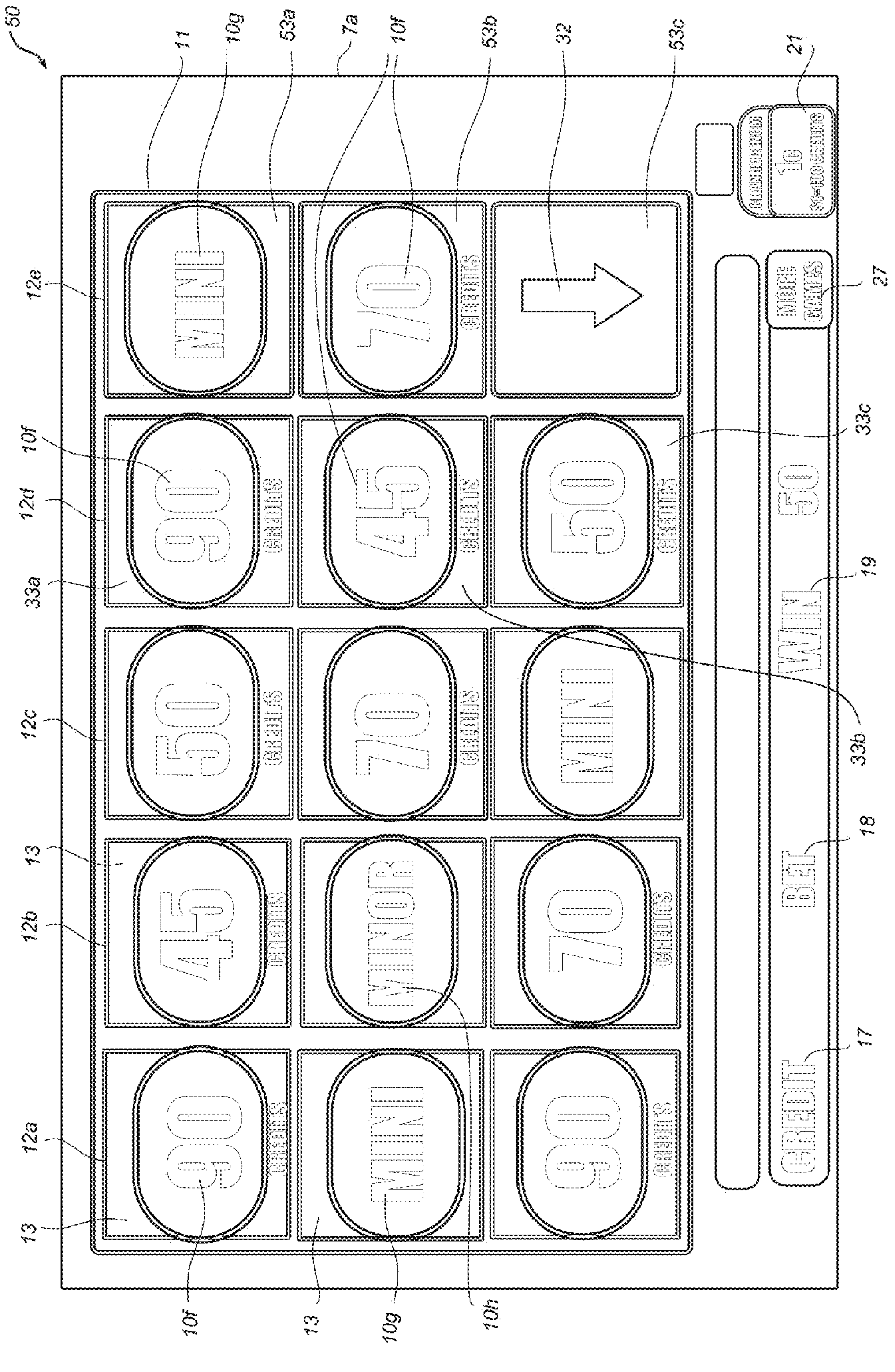
FIG. 14 is a partial simulated screen shot illustrating the game of FIG. 12.
Figure 15:
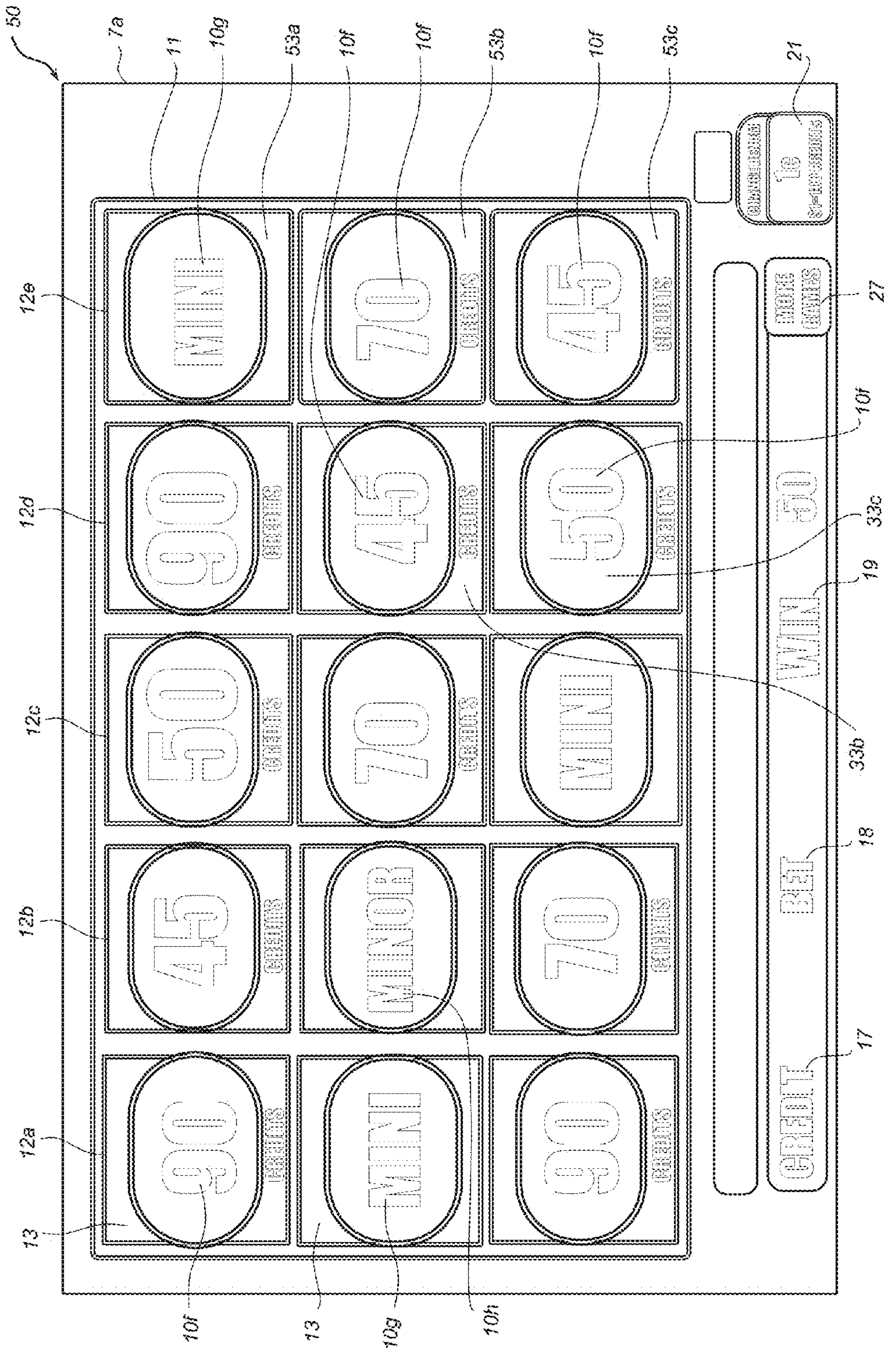
FIG. 15 is a partial simulated screen shot illustrating the game of FIG. 12.

The display of a game symbol 10f to 10h in each symbol position 13 and symbol position 33 of the extended array 11 is a trigger event that causes the display of a further feature game 50, as best shown in FIG. 12. The feature game 50 operates in the same way as the feature game 40, but in this case adds more symbol positions 53 to further extend the array 11. As best shown in FIG. 12, the array 11 has now been extended to a 5×3 array by the addition of a column 12e of reels having symbol positions 53. Similar to the feature game 40, the columns 12a to 12d of reels (and their respective symbol positions 13, 33) are held static to display the same game symbols 10f to 10h. The symbol positions 53 have their own individual reels that spin sequentially (i.e. one after the other), beginning from the top symbol position 53a and ending with the bottom symbol position 53c, as best shown in FIGS. 13 to 15. The inactive reels in the symbol positions 33b, 33c display the non-game image symbols 35. As with the feature game 40, in the feature game 50 the electronic game controller 4 randomly determines whether a game symbol 10f to 10h is to be displayed in each symbol position 53 and where the electronic game controller 4 randomly determines that a game symbol 10f to 10h should not be displayed in one or more of the symbol positions 53, then that symbol position 53 remains empty. For example, as best shown in FIG. 16, the electronic game controller 4 has randomly determined that a game symbol 10f to 10h should not be displayed in the symbol position 53c and so it remains empty.

The game symbols 10f to 10h displayed in the symbol positions 13, 33 of columns 12a to 12d when the feature game 50 was triggered do not change and remain the same, as can be seen in FIGS. 12 to 16. Only the reels in the additional symbol positions 53a to 53c spin to either display a game symbol 10f to 10h or not display any game symbol.

Figure 16:
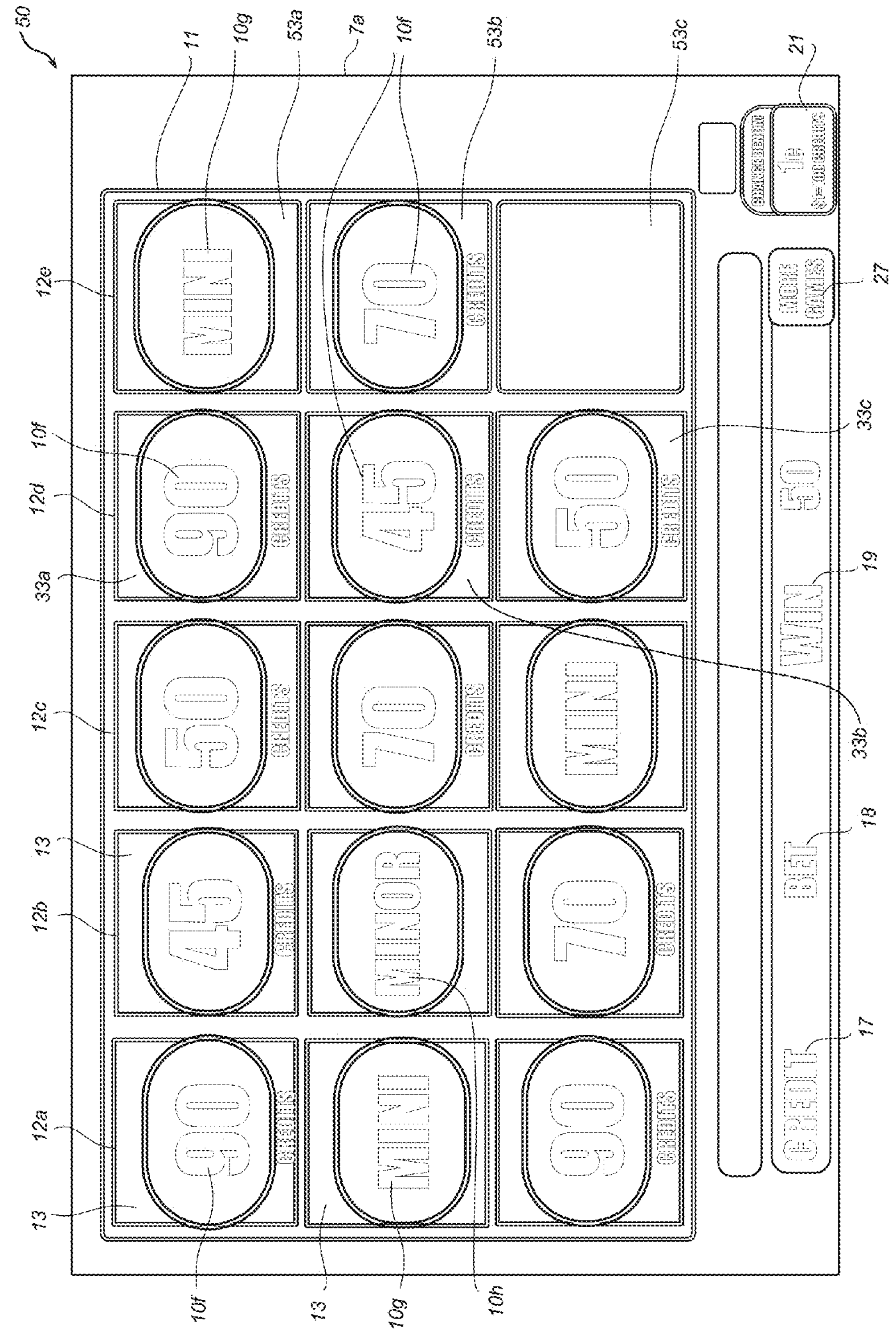
FIG. 16 is a partial simulated screen shot illustrating the game of FIG. 12.

When the last reel in symbol position 53c finishes spinning to display a game symbol 10f, the electronic game controller 4 then calculates the prizes to be awarded to the player by adding all the numerical prize values represented by game symbols 10f and any winning combination of bonus prize symbols 10g, 10h, which in this case would be three of a kind of the MINI game symbols 10g or MINOR game symbols 10h. In FIG. 15, the prize awarded to the player is 715 credits (being the sum of the numerical prize value game symbols 10f having prize values of 45, 50, 70 and 90 credits) and the MINI bonus prize (since there are three MINI game symbols 10g in the extended array). Thus, the player's excitement and interest is increased as he or she knows that as each symbol position 53 is filled with a game symbol 10f to 10h, the amount of the prize won is likely to increase. After the prizes are awarded to the player, the electronic gaming machine 1 resets to display the base game 30. The player can continue to play the base game 30 again by making another bet to commence play of the base game 30 and spin each reel in the symbol positions 13 in the array 11.

Where one of the symbol positions 53a to 53 does not display a game symbol 10f to 10h as randomly determined by the electronic game controller 4, as illustrated in FIG. 16, the player is awarded any prizes based on the displayed game symbols 10f to 10h in the same manner as described above in relation to the feature game 40.

FIGS. 17a to 17e show another embodiment of the invention, where the base game 30 and feature games 40, 50 are treated as a single feature game 60 for the base game 8 of FIG. 3. In this embodiment, the player is awarded with additional free spins in the feature game 60. In the feature game 60, the reels in each symbol position 13 spin simultaneously but stop randomly, meaning that one or more the reels can stop at the same time. In FIGS. 17a to 17e, the array 11 with its symbol positions 13 is progressively or gradually filled by game symbols 10g to 10h as each reel spins and stops, some at the same time and some as different times. As a consequence, the player's anticipation is enhanced as he or she cannot predict whether game symbols 10g to 10h will be displayed in each of the symbol positions 13 and which symbol position 13 displays the next game symbol. In this embodiment, the array 11 has its symbol positions 13 filled without a vacant symbol position after four "spins" or turns. However, it could take longer or shorter time to determine whether the array 11 displays game symbols 10*f* to 10*h* in the symbol positions 13.

Figure 18A:
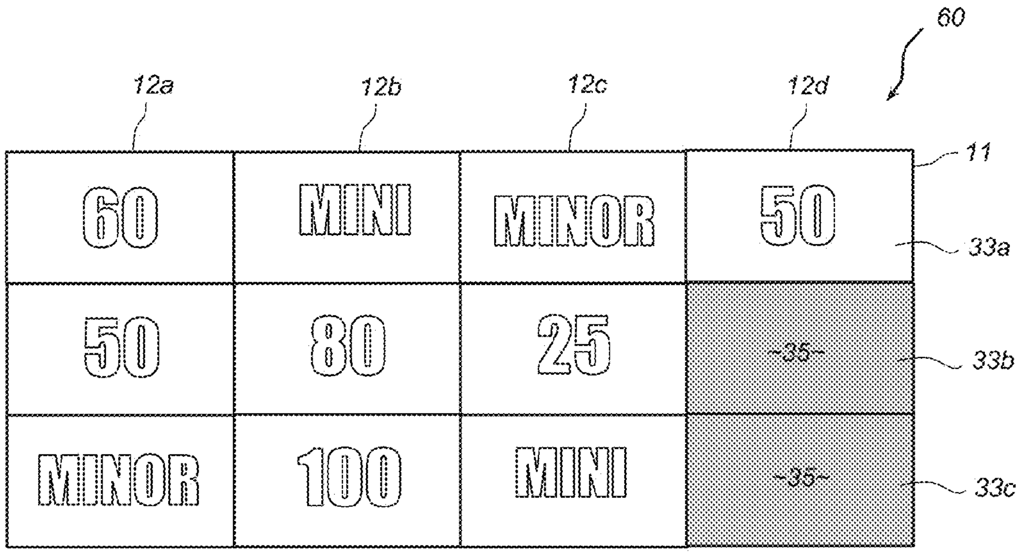
FIGS. 18*a* to 18*d* are schematic drawings illustrating the game of FIGS. 17*a* to 17*e;*
Figure 18B:
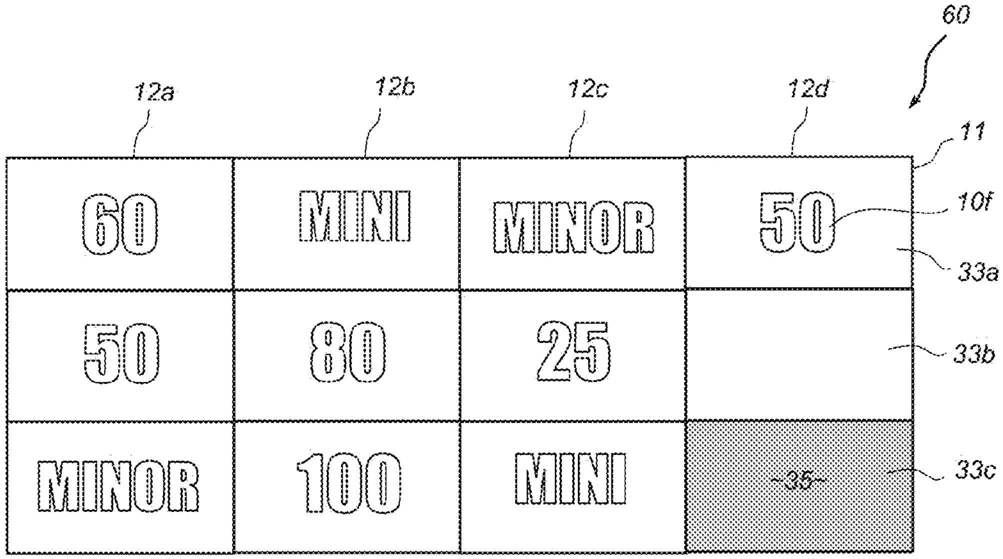
Figure 18C:
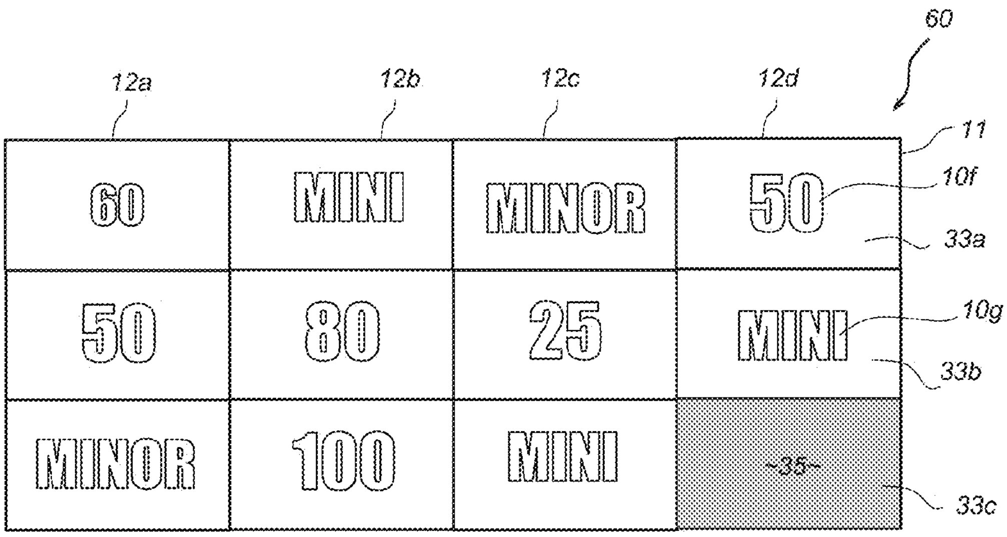
Figure 18D:
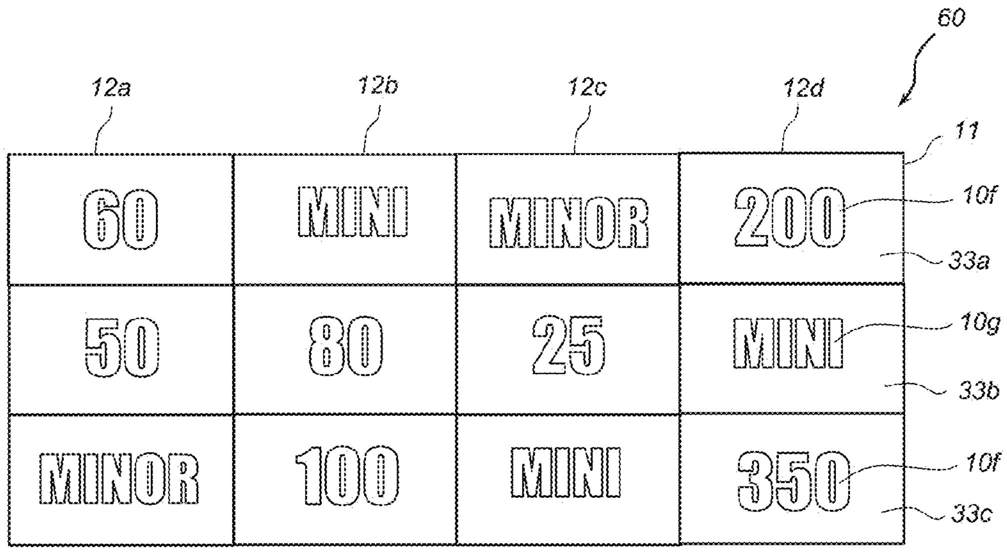

When each symbol position 13 is filled with a game symbol 10*f* to 10*h*, the player's excitement is further increased as he or she knows that it triggers expansion of the array 11 by adding more symbol positions 33 that can increase his or her winnings in the game 30. FIGS. 18*a* to 18*c* shows the progression of the expanded array 11 as the additional symbol positions 33*a* to 33*c* are sequentially filled with game symbols 10*f* to 10*h* to complete the expanded 4×3 array 11. As with the array 11 in FIGS. 17*a* to 17*e*, the player's anticipation is enhanced as he or she cannot predict whether a game symbol 10*g* to 10*h* will be displayed in each of the symbol positions 33.

Where a symbol position 33 does not display a game symbol 10*f* to 10*h*, such as the middle symbol position 33*b* shown in FIG. 18*d*, then the electronic game controller 4 randomly determines whether a game symbol is to be shown in the bottom symbol position 33*c*. If a game symbol is not shown in the bottom symbol position 33*c*, then the electronic game controller 4 calculates the prizes to be awarded to the player by adding all the numerical prize values represented by game symbols 10*f* and any winning combination of bonus prize symbols 10*g*, 10*h*, which in this case would be three of a kind of the MINI game symbols 10g or MINOR game symbols 10*h*. In the array 11 displayed in FIG. 18*d*, the player would be awarded a prize of 365 credits, corresponding to the sum of the game symbols 10*f*, since there is no winning combination of the bonus prize symbols 10*g*, 10*h*. If a game symbol is shown in the bottom symbol position 33*c*, then this would be added to the prize total. Where the game symbol is a numerical value game symbol 10*f*, the prize would be increased by prize value amount. Where the game symbol is a bonus prize symbol 10*g*, 10*h*, the amount of the bonus prize would be added to the prize based on the credit game symbols 10*f*.

When each symbol position 33 is filled with a game symbol 10*f* to 10*h*, as shown in FIG. 18*c*, the player's excitement is again further increased as he or she knows that it triggers a yet another expansion of the array 11 by adding more symbol positions 53 that can increase his or her winnings in the game. The player is again also awarded a set number of free spins or games, usually ten in number. FIGS. 19*a* to 19*e* shows the progression of expanded 5×3 array 11 as the additional symbol positions 53*a* to 53*c* are sequentially filled with game symbols 10*f* to 10*h* to complete the expanded 5×3 array 11. As with the array 11 in FIGS. 17*a* to 17*e*, the player's anticipation is enhanced as he or she cannot predict whether a game symbol 10*g* to 10*h* will be displayed in each of the symbol positions 53.

Figure 19A:
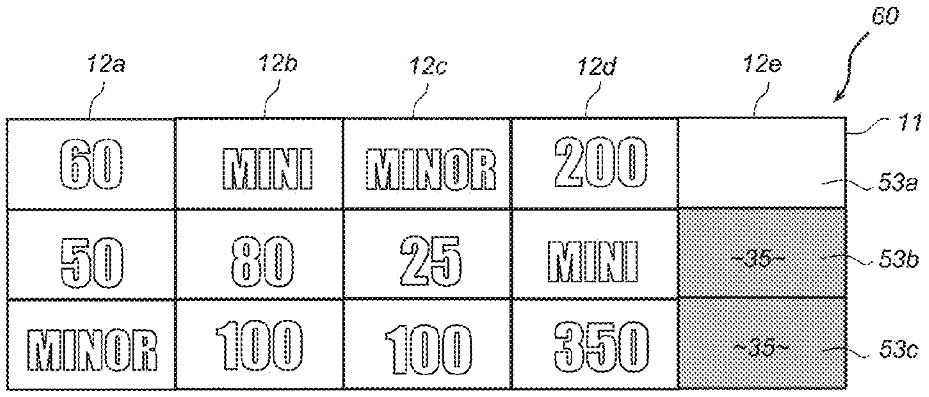
FIGS. 19*a* to 19*e* are schematic drawings illustrating the game of FIGS. 17*a* to 17*e;*
Figure 19B:
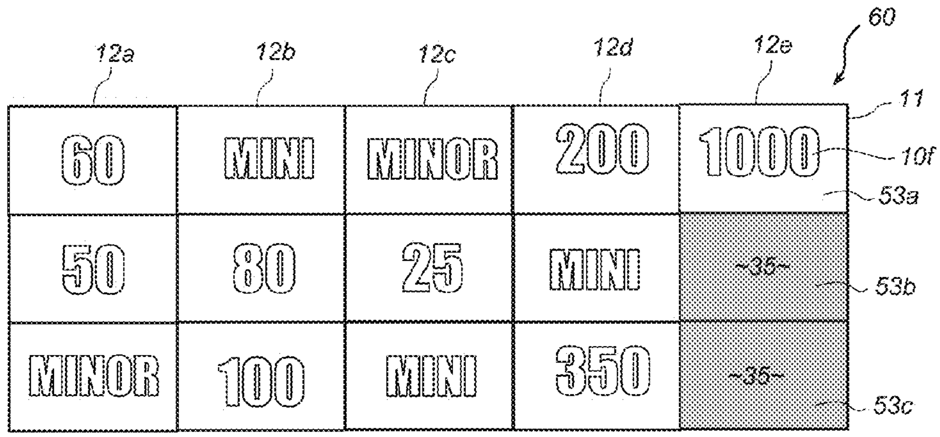
Figure 19C:
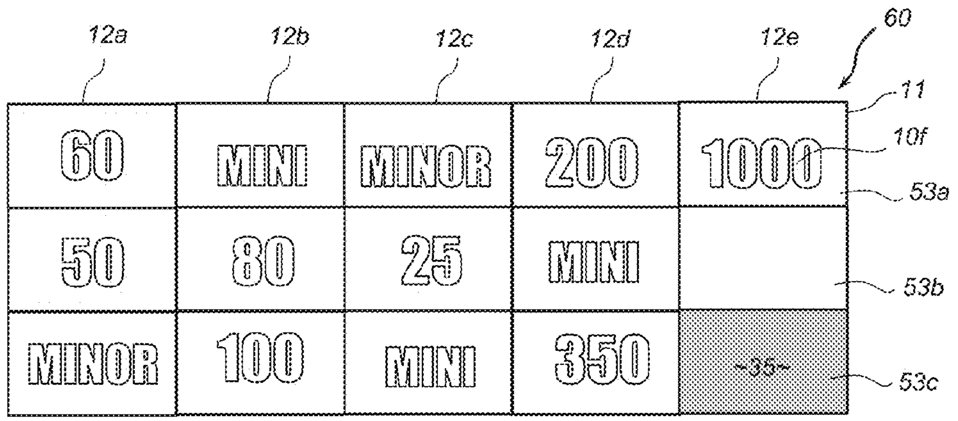
Figure 19D:
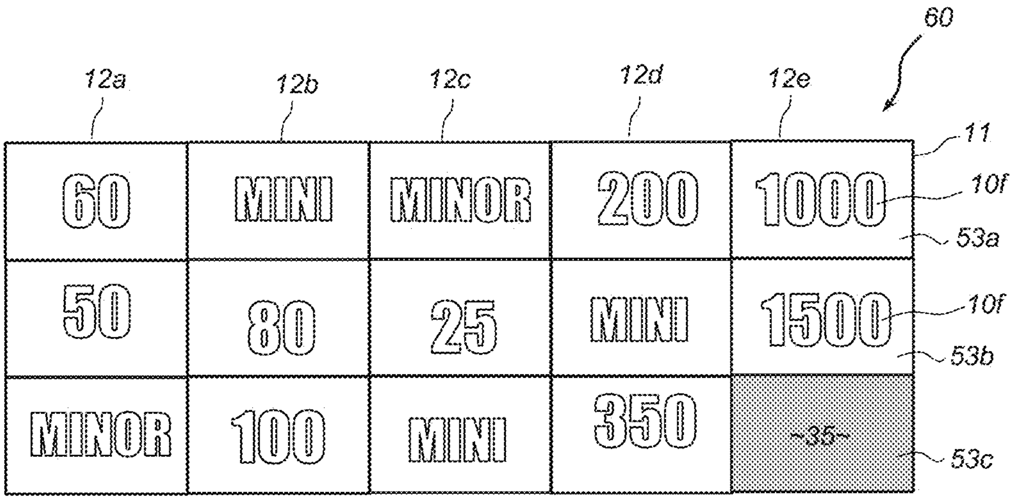
Figure 19E:
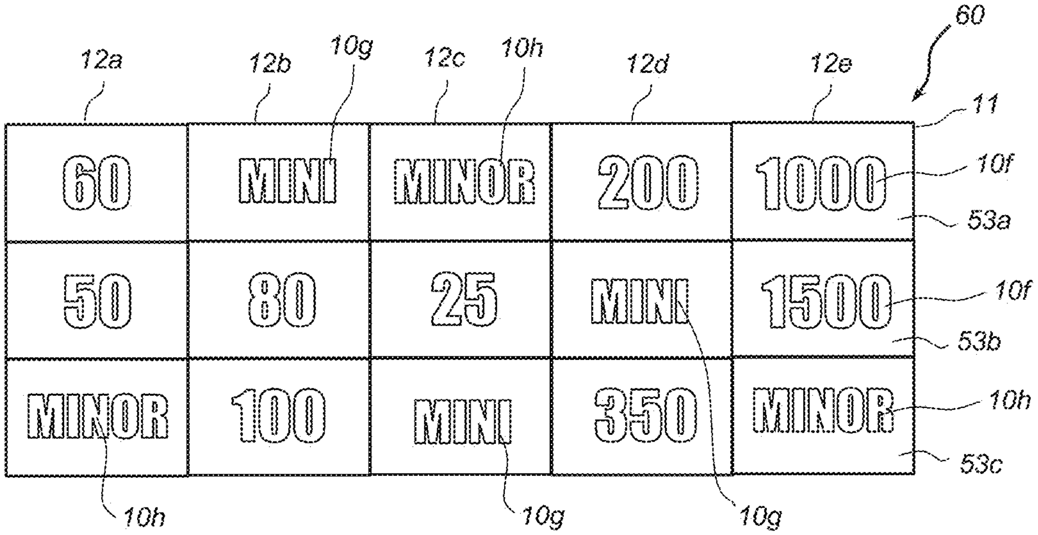

In FIG. 19*e*, all of the symbols positions 53 display game symbols 10*f* to 10*h* and so the electronic game controller 4 calculates the prize to be awarded to the player by adding all the numerical prize values represented by game symbols 10*f* and any winning combination of bonus prize symbols 10*g*, 10*h*. In this case, the prize would be 3215 credits (being the sum of the numerical prize value game symbols 10*f*), the MINI bonus prize and the MINOR bonus prize (since there are three MINI game symbols 10*g* and three MINOR game symbols 10*h*). If, for example, the middle and bottom symbol positions 53*b* did not display a game symbol 10*g* to 10*h* (corresponding to FIG. 19*c*) then the player would only receive a prize of 1715 credits (being the sum of the numerical prize value game symbols 100 and the MINI bonus prize (since there are three MINI game symbols 10*g*). Thus, the player's excitement and interest is increased as he or she knows that as each symbol position 53 is filled with a game symbol 10*f* to 10*h*, the amount of the prize won is likely to increase.

In some embodiments, the number of MINI and MINOR game symbols 10*g*, 10*h* act as multipliers for the MINI and MINOR bonus prizes. That is, the number of MINI and MINOR game symbols 10*g*, 10*h* multiplies the amount of the MINI and MINOR bonus prizes won by the player at the conclusion of the feature game. In other words, each MINI and MINOR game symbol 10*g*, 10*h* represents its own MINI and MINOR bonus prize that can be won multiple times. Referring to FIG. 19*e* as an example, not only would the player receive the bonus prize of 3215 credits for the credit game symbols 10*f*, but also the MINI bonus prize tripled (×3 for the three MINI game symbols 10*g*) and the MINOR bonus prize tripled (×3 for the three MINOR game symbols 10*h*).

In a further variation to the embodiment of FIGS. 17*a* to 19*e*, additional jackpots are awarded for filling a predetermined number of symbol positions 13, 33, 53 with game symbols 10*f* to 10*h*. For example, if the player is able to reach the third stage of the feature game 60 and add symbol positions 53, he or she would receive a MAXI jackpot if thirteen symbol positions 13, 33, 53 display game symbols, a MAJOR jackpot if fourteen symbol positions 13, 33, 53 display game symbols and a GRAND jackpot if all fifteen symbol positions 13, 33, 53 display game symbols. Thus, more generally, a threshold number of game symbols displayed in the symbol positions 13, 33, 53 results in the award of a bonus prize of higher worth and in some embodiments that threshold number is a majority of the number of the symbol positions 13, 33, 53 in the array 11.

Figure 17A:
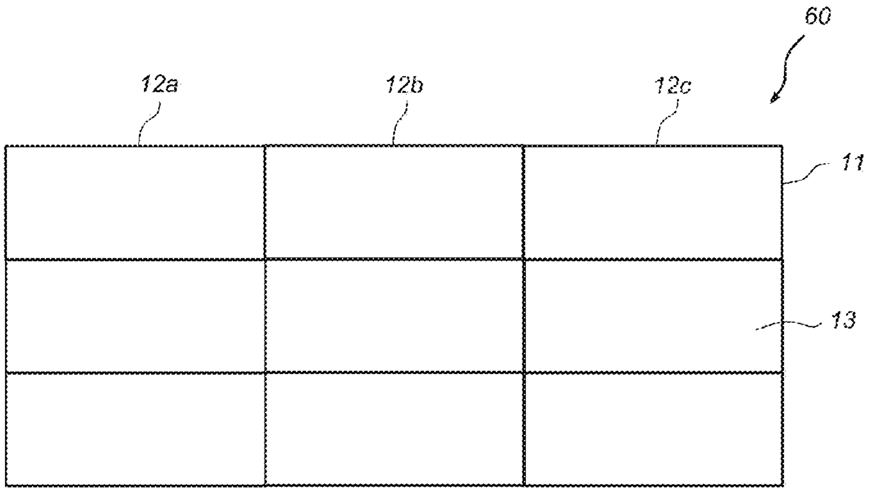
FIGS. 17*a* to 17*e* are schematic drawings illustrating a yet further game played on the electronic gaming machine of FIG. 1.
Figure 17B:
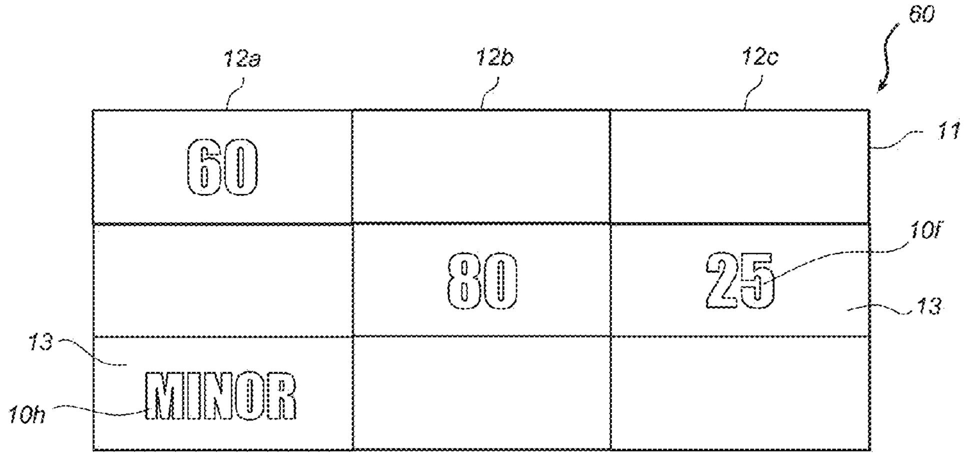
Figure 17C:
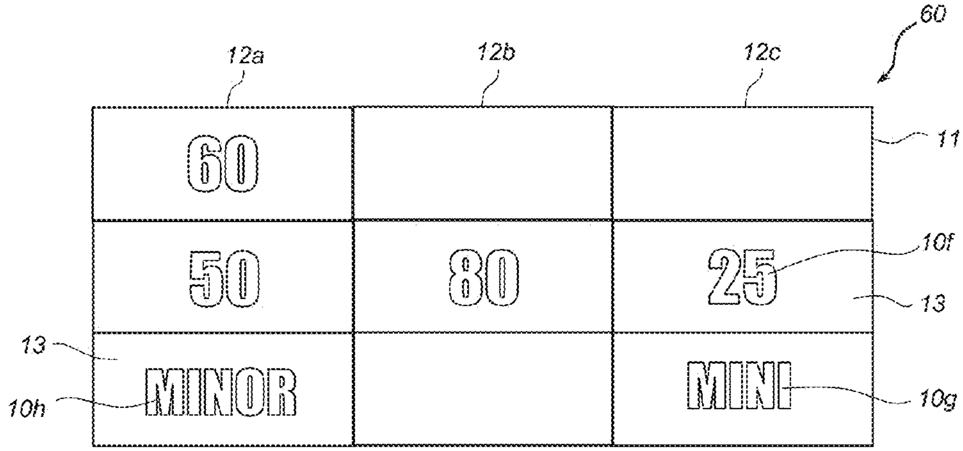
Figure 17D:
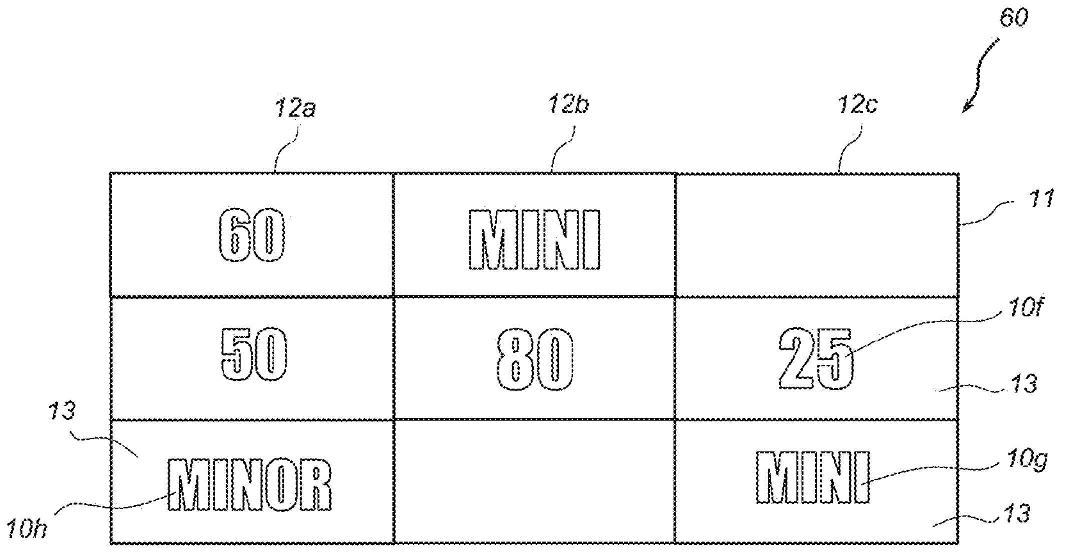
Figure 17E:
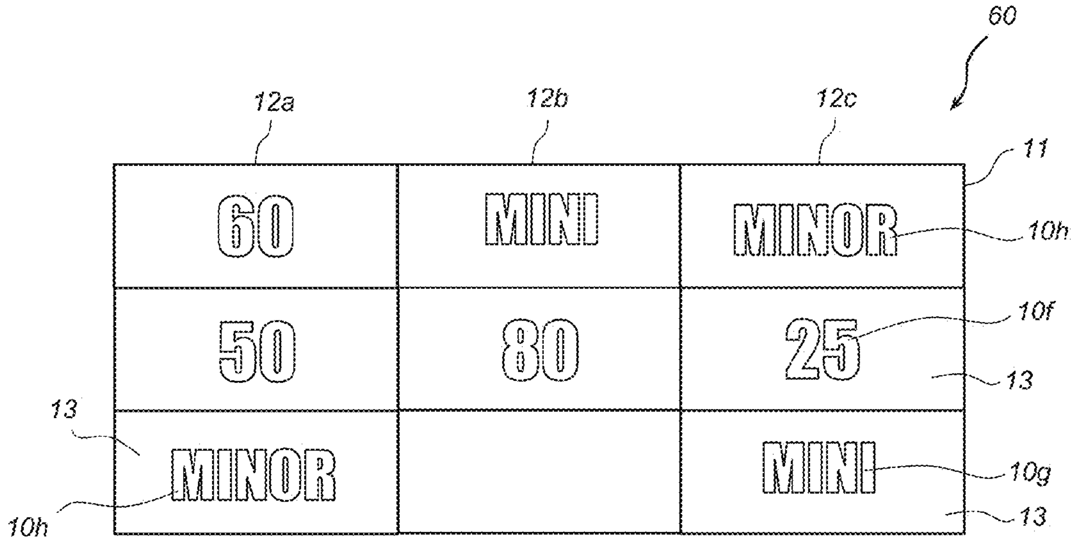

Another variation to the embodiment of FIGS. 17*a* to 19*e* awards a free spin for each game symbol 10*f* to 10*h* that is displayed in the array 11. Thus, if the player completes the array 11 as shown in FIG. 17*e*, he or she would receive nine free spins. If the player completes the expanded array 11 as shown in FIG. 18*d*, he or she would receive twelve free spins. If the player completes the expanded array 11 as shown in FIG. 19*e* he or she would receive fifteen free spins. Thus, more generally additional plays of the game are awarded as the number of symbol positions 13, 33, 53 increases. Where the player still has a number of free spins remaining when the feature game 60 has ended (i.e. the symbol positions 13, 33, 53 either display game symbols 10*f* to 10*h* or no game symbol at all, resulting in the award of the prize(s)), the feature game 60 resets to the array 11 as shown in FIG. 17*a* and the remaining free spins are used for the reset feature game, where the player can accrue additional free spins when a symbol position 13 is filled with a game symbol 10*f* to 10*h*. When the player runs out of free spins or games, the feature game 60 terminates and awards all the prizes as seen on the array 11. Alternatively, the feature game 60 is also terminated when all fifteen symbol positions 13, 33, 53 are filled with game symbols 10*f* to 10*h* and the player wins the GRAND jackpot.

Yet another variation to the embodiment of FIGS. 17*a* to 19*e* increases the numerical value of the credit game symbols 10*f* as more symbol positions 33, 53 are added, thus increasing the value of the potential prizes to be won in the extended or expanded arrays 11.

While the game has been described as adding the same number of symbol positions 33, 53 as the number of symbol positions 13 in a column 12 of the array 11, it will be appreciated that in some embodiments, the number of symbol positions 33, 53 that are displayed in addition to the symbols positions 13 in the array 11 can be either less or more to create an expanded or extended array having an unequal number of rows and/or columns. For example, only one or two symbol positions 33, 53 could be added to the symbol positions 13 in the array 11 to create a row with an extra symbol position or a column 12*d*, 12 with only one or two symbol positions 33, 53. In another example, four or five symbol positions 33, 53 are added to the symbol positions 13 in the array 11 to create a new row longer than the rows in the original array, a new column longer than the columns 12 or added to different columns to create an array with uneven rows and/or columns. In yet another example, less symbol positions 33 are added than the number of the symbol positions 13 in a row or column of the array 11 but more symbol positions 53 are added than the number of the symbol positions 13 in a row or column of the array 11, and vice versa. Hence, any combination of number of symbol positions 33, 53 can be added to the symbol positions 13 in the array 11.

Moreover, while the symbol positions 33, 53 are displayed so as to extend or expand the array 11, in other embodiments the symbol positions 33, 53 are displayed on the lower display screen 7*a* (or elsewhere on the display screen 7) apart from the array 11 or even adjacent but not connected to the array 11. In some embodiments, the symbol positions 33, 53 are displayed together in their own array separate from the array 11 to distinguish them from the original array. In other embodiments, the symbol positions 33 are displayed to extend or expand the array 11 while the symbol positions 53 are displayed apart from, adjacent but not connected to and/or in their own array separate from the array 11.

Also, it will be appreciated that in some embodiments the symbol positions 13, 33, 53 are arranged into reels corresponding to columns 12*a* to 12*e*, instead of having individual reels in each symbol position. In addition, in other embodiments the reels may be horizontal (i.e. rows) instead of vertical (columns 12*a* to 12*e*).

In some embodiments, the game 30 awards prizes for the game symbols displayed on the array 11 once all the symbol positions 13 are filled and then resets the symbol positions in the feature game 40 so that the reels in the symbol positions 13 are not static but respin. This may also be done with the feature game 40, with prizes awarded for the game symbols displayed on the extended array once all the symbol positions 13, 33 are filled and then resets the symbol positions 13, 33 for the feature game 50.

In some embodiments, prizes are only awarded for pay lines selected by the player from the array 11. In this case, when the array is expanded in the feature games 40, 50 the pay lines 14 are also extended to include the additional symbol positions 33, 53.

In some embodiments, the electronic game controller randomly determines that a game symbol does not appear in at least one of the symbol positions 13, 33, 53, a terminator symbol is displayed in the at least one symbol position and prizes for any predetermined winning combinations of the displayed game symbols 10*f* to 10*h* in said array are awarded to the player.

In some embodiments, the completion of the extended array 11 in the feature game 50 further triggers the addition of more symbol positions. This can continue up to any number of additional symbol positions, as desired. Thus, the feature games are able to trigger further feature games in a cascading fashion.

In some embodiments, the base game 30 and feature games 40, 50 constitute a single game so that completion of the "sub-games" 30, 40, 50 occur in a single play. In other embodiments, the base game 30 is also a feature game and in this case, the base game could be a standard game 8 like that illustrated in FIG. 3 and a combination of trigger symbols in the base game 8 activates the feature game 60 comprising games 30, 40, 50.

In some embodiments, at least one of the game symbols displayable in the symbol positions 33, 53 is different in type to the game symbols 10*f* to 10*h* displayed in the symbol positions 11. Likewise, the at least one of the game symbols displayable in the symbol positions 53 is different in type to the game symbols displayable in the symbol positions 33. In this way, game symbols of greater prize value may be displayed in the extended arrays 11 in the feature games 40, 50. In other embodiments, the at least one game symbol comprises a jackpot symbol or a symbol associated with a game enhancing element.

In some embodiments, at least one of the game symbols comprises a game enhancing symbol that confers a game enhancing element to the player. It is further preferred that the game enhancing element modifies the result of a play of the game, which can be any one or combination of the base games 8, 30 and feature games 9, 40, 50. The game enhancing elements may provide different types of effects or modifications of the game play result. In one embodiment, the game enhancing element comprises the award of one or more plays of the game that do not require a bet from the player. In other words, the game enhancing element awards a predetermined number of "free" games. In some embodiments, the game enhancing element comprises at least one or more a win multiplier, wild multipliers, bonus wilds, symbols that cause the award of additional free games, trigger symbols to retrigger the at least two second arrays, held columns, random wild symbols, stacked symbols, bonus symbols, new game symbols, reveal symbols, progressives, bonus credits, jackpot symbols, and one or more symbol replacements. A variety of game enhancing elements can be awarded by the game enhancing symbols, including:

- symbols that award a predetermined number of free plays of the game;
- win multiplier symbols that multiply the amount of any win from one of the predetermined winning combinations;
- "wild" symbols that cause the display of substitute symbols in randomly selected symbol positions;
- bonus symbols that awards a bonus prize, either as a monetary amount or as a bonus credit;
- wild multiplier symbols that cause the display of substitute symbols on the array 11 and multiplies the amount of any win from one of the predetermined winning combinations;
- bonus wild symbols that cause the display of substitute symbols on the array 11 and awards a bonus prize;
- symbols that cause the award of additional free plays of the game;
- symbols that cause one or more of the symbol positions to be held static (typically one or more reels 12*a* to 12*e*) and display substitute symbols on the array 11;
- symbols that cause the same game symbol to be stacked in a group of symbol positions, typically the group being one or more reels 12*a* to 12*e;*
- symbols that cause the display of new game symbols on the array 11;
- "reveal" symbols that cause a game symbol to reveal another game symbol; and "replacement" symbols that cause one or more game symbols to be replaced by other game symbols in the array 11.

These game enhancing symbols do not modify the function or value of the game symbols 10 that appear on the arrays 11, but instead confer bonus prizes, free games or change existing game symbols for other game symbols (such as replacing picture, royal card or symbols belonging to a reel with wild/substitute symbols). Where the function of game symbols 10 have been changed or the game symbols 10 are replaced, then this modification can take effect with the next play of the game instead of applying to the result of the spun array 11. In another embodiment, the game enhancing symbols may indicate the duration in which its game enhancing element is applied, such as a predetermined number of spins or a predetermined time period.

It will be appreciated that in other embodiments, game enhancing elements can also be awarded as a separate aspect of the games 8, 9, 30, 40, 50, 60. The game enhancing elements may further be awarded in addition or as an alternative to the enhanced prizes awarded based on winning combinations of game symbols 10 in the games 8, 9, 30, 40, 50, 60. In a further embodiment, the award of game enhancing elements can be done by way of a sixth reel or the appearance of game enhancing symbols in the reels 12*a* to 12*e*.

In some embodiments, the game enhancing symbols include "collector"-type game enhancing symbols which award points or tokens. The collection of points or tokens during the base game 8 and/or feature game 9 leads to the trigger of additional prizes or game enhancing symbols, depending on the number of points or tokens that are collected. These additional prizes can include stand alone progressive jackpots, bonus prizes and super games, which are enhanced versions of free spins or games where there are greater pay outs or frequency of wins.

In the described embodiments, each MINI and MINOR bonus prizes each comprises a jackpot. In other embodiments, the bonus prizes available include both jackpots and other types of bonuses, such as a monetary amount in either cash or credit amount. In one embodiment, the jackpot comprises a mystery jackpot which is associated with at least one of a start amount, increment amount and threshold 'win before' amount. Alternatively, the jackpot comprises a standalone progressive jackpot. In a further alternative, the jackpot comprises a linked progressive jackpot associated with a linked jackpot controller. In yet another alternative, the jackpot comprises a symbol driven jackpot associated with a trigger combination of game symbols appearing in the game.

The jackpots offered by the electronic gaming machine 1 through the games 3, 40, 50 are effectively symbol driven jackpots. However, in other embodiments the jackpots may be standalone progressive jackpots, fixed jackpots, mystery jackpots and any combination thereof, including symbol driven jackpots (i.e. a mixture of different types of jackpots). In some embodiments, the jackpots are limited to one of the feature games 40, 50. In other embodiments, the jackpots are shared by the all the games 8, 9, 30, 40, 50, 60. That is, the jackpots could be won through play of the games 8, 9, 30, 40, 50, 60, although they are more likely to be won through the games 30, 40, 50, 60.

A progressive jackpot prize takes a portion of each bet (typically a set percentage of each bet) made on the electronic gaming machine and thus the amount of the progressive jackpot incrementally increases as more bets are made on the electronic gaming machine 1. The progressive jackpot is typically awarded when a winning game combination associated with the jackpot occurs in the game played on the electronic gaming machine. In many cases, progressive jackpots are associated with the least probable winning combination and are commonly the highest paying award of the electronic gaming machine. In other cases, a separate trigger event can be used to award the progressive jackpot prize, such as a special jackpot symbol, a trigger event internally generated by the electronic game controller. Alternatively, or additionally, once a certain threshold is met, either a certain amount that has been bet on the electronic gaming machine or the incremented amount of the progressive jackpot, a trigger event is activated in the electronic gaming machine to pay out the progressive jackpot prize. Progressive jackpot prizes also tend to be shared amongst multiple electronic gaming machines so as to increase the amount of the progressive jackpot prize and hence increase player interest in playing one of the electronic gaming machines. In some electronic gaming machines, more than one jackpot or progressive jackpot is offered by the electronic gaming machine or electronic gaming machines linked together.

The jackpot or bonus prizes may also be mystery jackpots rather than symbol driven jackpots. That is, none of the symbols in the game trigger the jackpot; hence the trigger event is a "mystery". By way of comparison, a standard jackpot is typically symbol driven in that a particular combination of symbols must occur in the game to trigger the standard jackpot.

The trigger event for the mystery jackpot can be one randomly generated by the electronic game controller 4 for each play of the games 8, 9, 30, 40, 50, 60. One way to implement the random determination of the trigger event is for the electronic game controller 4 to internally generate a random number and check if it is a predetermined number or within a predetermined range of numbers that will initiate the appearance of the trigger symbols. For example, the predetermined range of numbers could be the range of numbers between 1 and 10 and the electronic game controller 4 internally generates a random number between 1 and 100. If the generated number is any one of numbers 1 to 10, then this results in the electronic game controller 4 causing the trigger event to occur and award the progressive jackpot prize. It will be appreciated that this manner of determining the trigger event may also be used to determine whether the feature game 9 is triggered in the base game 8 or the feature games 40, 50 are triggered in the base game 30 or feature game 40, respectively.

Progressive jackpots can be confined to the electronic gaming machine 1 as so called "standalone" progressive jackpots. Alternatively, the jackpot is a wide area or an in-house linked progressive jackpot prize. In other embodiments, one or more the progressive jackpot prizes are configured to be part of a wide area or in-house linked progressive jackpot prize. In other words, the progressive jackpot prizes can be awarded on a group of networked gaming machines in a specified area or a group of specified electronic gaming machines that are linked together for jackpot purposes (usually via a central jackpot controller). The jackpot prizes can also be shared with any other games offered on the same electronic gaming machine 1 (as in multi-game gaming machines).

During play of the games 8, 9, 30, 40, 50, 60, the electronic game controller will determine whether the trigger event for the jackpot 40 has occurred. After the jackpot(s) are awarded, the amounts for any awarded jackpots are reset. The amounts of the jackpots that have been won can be reset either to a predetermined start amount or simply increment upwardly from zero where the won jackpot is a progressive jackpot.

In some embodiments, the in-game trigger event is determined at the end or during the play of the game; i.e. at the end or during a spin of the reels 12. In some embodiments, the in-game trigger event occurs in a preceding play of the game so that the result of the in-game trigger event takes place in a subsequent play of the game, typically the next play of the game after the preceding play but could include a later successive play of the game.

In some embodiments, the game comprises a base game and/or a feature game. Where the game comprises a base game and a feature game, it is preferred that the game symbols in the feature game and the base game are arranged in arrays of predetermined game or symbol positions, the arrays being the same in size, dimensions, shape and/or type. Alternatively, the game symbols in the feature game and the base game are arranged in arrays that are different in size, dimensions, shape and/or type. In some embodiments, the player selectively starts and/or stops play of the reels in the array 11.

In some embodiments, a feature game trigger event occurs in the base game to trigger the feature game. In one embodiment, the feature game trigger event comprises a random event determined by the electronic game controller at the start of play of the feature game. In another embodiment, the feature game trigger event comprises the appearance of at least one trigger symbol in the base game array. In another alternative, the feature game trigger event comprises an in-game event during play of the base game.

In some embodiments, the array (including the base game array and/or the feature game array) takes any one of a circular, triangular, oval, semi-circular, hexagonal, pentagonal, octagonal, non-rectangular or polygonal shape, or even arrays that do not comprise rows and columns. For example, instead of a standard square or rectangular array 11, the games 8, 9, 30, 40, 50, 60 may use arrays having any number of different shapes, such as triangular, circular, square, hexagonal, hemi-spherical or other polygonal shapes. In another example, where the array is circular, the predetermined game positions can take the form of pie-shaped slices or wedges.

In some embodiments, in response to a feature game trigger event in the base game, the electronic game controller causes the display to display game symbols for playing the feature game. Alternatively, the electronic game controller causes the display of the feature game and the base game during play of the base game, the feature game being inactive until triggered. In this embodiment, the change in the feature game from being inactive to active may be indicated on the display. This indication may be visual, aural or a combination of both.

In some embodiments, the electronic gaming machine comprises an input device for receiving commands from the player to play the game, wherein the input device comprises one or more buttons in electronic communication with the electronic game controller to transmit the player commands to the electronic game controller.

In some embodiments, the input device comprises one or more buttons on the housing, the buttons being in electronic communication with the electronic game controller. In other embodiments, the buttons are arranged on a console of the housing. Alternatively or additionally, the input device comprises a touch sensitive surface on the display for receiving commands from the player, the touch sensitive surface being in electronic communication with the electronic game controller to transmit the player commands to the electronic game controller.

In some embodiments, the electronic gaming machine comprises a value transfer mechanism for receiving value from the player to make a bet and initiate a play of the game. In other embodiments, the value transfer mechanism also pays the prizes to the player using value in an amount equal to an awarded prize. It is further preferred that the housing comprises the value transfer mechanism. In one embodiment, the value transfer mechanism comprises one or more vending slots for paying and/or receiving value. In other embodiments, the value transfer mechanism comprises a value input/value output device. In further embodiments, the value transfer mechanism comprises a coin slot or acceptor, a paper currency acceptor, a ticket reader and/or printer or a card reader and/or writer.

In other embodiments, the electronic gaming machine 1 also offers the player the opportunity to play in community games against other players in so-called tournament games, or even in player versus player games. This is typically implemented by electronically linking several electronic gaming machines 1 in a group within a gaming venue. The player versus player or tournament game can be played simultaneously by the players or can be staggered, with some players playing at one time and some players playing at another time in the same game. In this situation, the player versus player or tournament game comprises the award of an additional bonus prize in addition to the jackpot prizes in the selected available jackpot set.

While the same game format is essentially used across the base game 8, feature game 9, base game 30 and feature games 40, 50, it will be appreciated that the game format may vary across these games, as well as between base games where more than one game is offered by the same electronic gaming machine 1. For example, one of the games may be a wheel-type game or a four reel game and another of the games may be a standard five reel game. Similarly, the games may each have different game symbols, game rules and pay tables that are unique to each game.

In other embodiments, the base and feature games need not be displayed on a single video screen 7. Instead, they may be displayed on separate video screens, with the lower playing area 7*a* appearing in a lower video screen and the upper display area 7*b* on an upper video screen. Also, the order can be reversed, with the playing area 7*a* appearing on an upper video screen or upper part of a single video display screen 7 and the display area 7*b* appearing on a lower video screen or lower part of a single video display screen.

In another embodiment, the video screen 7 is a touch screen for use in addition to the player-actuatable buttons 6 so as to enable the player to select the bet level (such as bet denominations or bet per pay line 14) as well as other various features, such as making monetary bets for the game, initiating play of any base and feature games played and responding to any messages or requests issued on the electronic gaming machine 1 by the electronic game controller 4. In this case, the player may control when the reels 12 start spinning and stop spinning, either individually or collectively, by simply touching the reels 12. Control over spinning of the reels 12 can also be implemented through the buttons 6 on the console 3. This increases player interaction and provide the player with an opportunity to guess when a particular game symbol 10 may appear in the reels 12.

It is also appreciated that while the embodiments have been described in the context of an electronic gaming machine 1, the invention in other aspects encompasses gaming methods for an electronic gaming machine comprising a display for displaying a game and an electronic game controller for controlling the display of the game symbols for playing the game on the display. According to one such aspect, a gaming method for the electronic gaming machine comprises controllably displaying game symbols for playing a game, wherein the game comprises game symbols and predetermined winning combinations of randomly selected game symbols award prizes to a player; displaying an array of first symbol positions in which the game symbols are able to be displayed; randomly determining whether to display one of the game symbols in each first symbol position; in response to each first symbol position in the array displaying a game symbol, displaying one or more second symbol positions in addition to the first symbol positions; and randomly determining whether to display a game symbol in each of the one or more second symbol positions.

In another aspect, a gaming method for an electronic gaming machine comprising a display for displaying a game; an electronic game controller for controlling the display of the game symbols for playing the game on the display; and a value transfer mechanism for receiving value from the player to initiate a play of the game, the method comprising: controllably displaying game symbols for playing a game, wherein the game comprises game symbols and predetermined winning combinations of randomly selected game symbols award prizes to a player; displaying an array of first symbol positions in which the game symbols are able to be displayed; randomly determining whether to display one of the game symbols in each first symbol position; in response to each first symbol position in the array displaying a game symbol, displaying one or more second symbol positions in addition to the first symbol positions; and randomly determining whether to display a game symbol in each of the one or more second symbol positions.

In some embodiments, the method comprises displaying the one or more second symbol positions on the display. In other embodiments, the method comprises displaying the one or more second symbol positions adjacent the array. Alternatively, the method comprises displaying the one or more second symbol positions with the first symbol positions to form an extended array. In yet another embodiment, the method comprises displaying the one or more second symbol positions to form another array separate to the array.

In some embodiments, the method comprises arranging the first symbol positions into rows and/or columns in the array, and displaying a number of the second symbol positions equivalent to the number of symbol positions in one of the rows and/or columns. In other embodiments, the method comprising arranging the first symbol positions into reels in the array, and displaying a number of the second symbol positions equivalent to the number of symbol positions in one of the reels.

In some embodiments, the method comprises awarding prizes for predetermined winning combinations formed from the game symbols displayed in the first and second symbol positions.

In some embodiments, the method comprises providing each second symbol position with a reel separate to the other second symbol positions.

In some embodiments, where the electronic game controller randomly determines that a game symbol does not appear in at least one of the first symbol positions, the method comprises not displaying a game symbol in the at least one first symbol position and awarding prizes for any predetermined winning combinations of the displayed game symbols in the array.

In some embodiments, where the electronic game controller randomly determines that a game symbol does not appear in at least one of the first symbol positions, the method comprises displaying a terminator symbol in the at least one first symbol position and awarding prizes for any predetermined winning combinations of the displayed game symbols in the array.

In some embodiments, in response to the one or more second symbol positions each displaying a game symbol, the electronic game controller causes the display of one or more third symbol positions in addition to the first symbol positions and the second symbol positions, and the electronic game controller randomly determines whether to display a game symbol in each of the one or more third symbol positions.

In some embodiments, the method comprises displaying the one or more third symbol positions on the display. In other embodiments, the method comprises displaying the one or more third symbol positions adjacent the array. Alternatively, the method comprises displaying the one or more third symbol positions with the first symbol positions to form an extended array. In yet another embodiment, the method comprises displaying the one or more third symbol positions with the second symbol positions to form an extended array. In further embodiments, the method comprises displaying the one or more third symbol positions to form a further array separate to the array.

In some embodiments, the method comprises arranging the first and second symbol positions into rows and/or columns in the array, and displaying a number of the third symbol positions equivalent to the number of symbol positions in one of the rows and/or columns.

In some embodiments, the method comprises arranging the first and second symbol positions into reels in the array, and displaying a number of the third symbol positions equivalent to the number of symbol positions in one of the reels.

In some embodiments, the method comprises awarding prizes for predetermined winning combinations of game symbols displayed in the first, second and third symbol positions.

In some embodiments, where the electronic game controller randomly determines that a game symbol does not appear in at least one of the second symbol positions, the method comprises not displaying a game symbol in the at least one second symbol position and awarding prizes for any predetermined winning combinations of game symbols displayed in the first and second symbol positions. In other embodiments, where the electronic game controller randomly determines that a game symbol does not appear in at least one of the second symbol positions, the method comprises displaying a terminator symbol in the at least one second symbol position and awarding prizes for any predetermined winning combinations of game symbols displayed in the first and second symbol positions.

In some embodiments, the method comprises displaying in each first symbol position a reel separate to the other first symbol positions.

Figure 20:
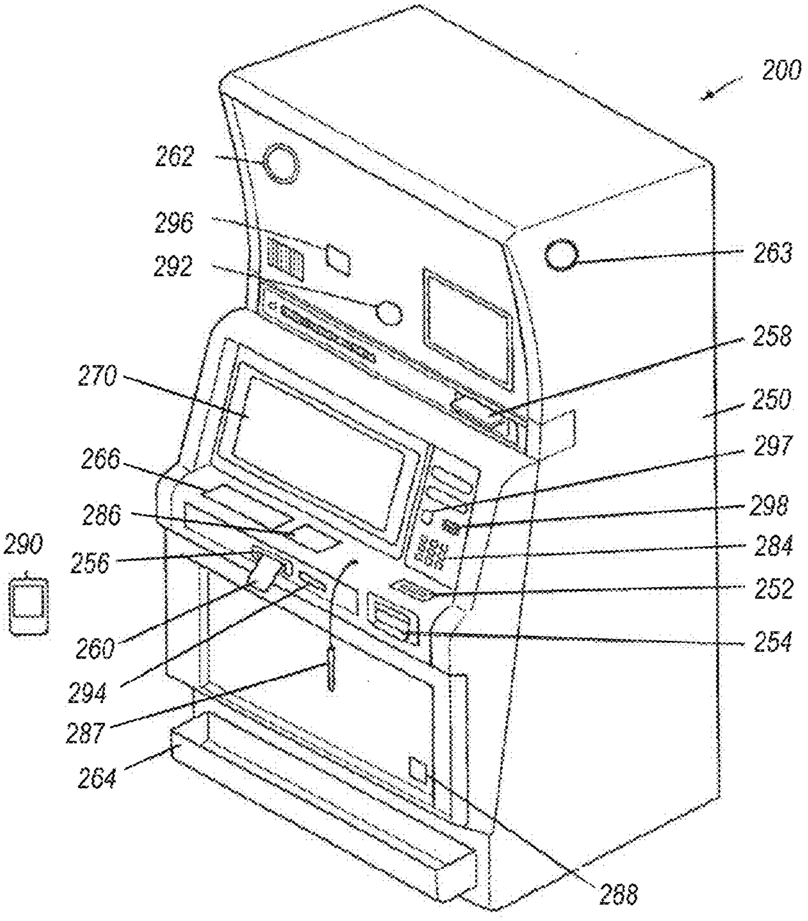
FIG. 20 is a perspective view of an electronic gaming machine according to yet another embodiment of the invention.

Referring to FIG. 20, another embodiment of the invention is shown in the form of an electronic gaming machine 200. The electronic gaming machine 200 may include a housing or cabinet 250 and one or more value transfer mechanisms or devices, which may include a coin slot or acceptor 252, a paper currency or bill acceptor 254, a ticket reader/printer 256 and a card reader 258, which may be used to input value to the electronic gaming machine 200. A value transfer device may include any device that can accept value from a player. The topper (not shown) may be mounted to the top of the electronic gaming machine 200.

If provided on the electronic gaming machine 200, the ticket reader/printer 256 may be used to read and/or print or otherwise encode ticket vouchers 260. The ticket vouchers 260 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 260 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 260 could be printed with an optically readable material such as ink, or data on the ticket vouchers 260 could be magnetically encoded. The ticket reader/printer 256 may be provided with the ability to both read and print ticket vouchers 260, or it may be provided with the ability to only read or only print or encode ticket vouchers 260. In the latter case, for example, some of the electronic gaming machines 200 may have ticket printers 256 that may be used to print ticket vouchers 260, which could then be used by a player in other electronic gaming machines 200 that have ticket readers 256.

If provided, the card reader 258 may include any type of card reading device, such as a magnetic card reader or an optical card reader, and may be used to read data from a card offered by a player, such as a credit card or a player tracking card. If provided for player tracking purposes, the card reader 258 may be used to read data from, and/or write data to, player tracking cards that are capable of storing data representing the identity of a player, the identity of a casino, the player's gaming habits, etc.

The electronic gaming machine 200 may include one or more audio speakers 262, a coin payout tray 264, an input control panel 266, and a colour video display unit 270 for displaying images relating to the game or games provided by the electronic gaming machine 200. The audio speakers 262 may generate audio representing sounds such as the noise of spinning reels, a dealer's voice, music, announcements or any other audio related to a game. The input control panel 266 may be provided with a plurality of pushbuttons or touch-sensitive areas that may be pressed by a player to select games, make wagers, make gaming decisions, etc.

Figure 21:
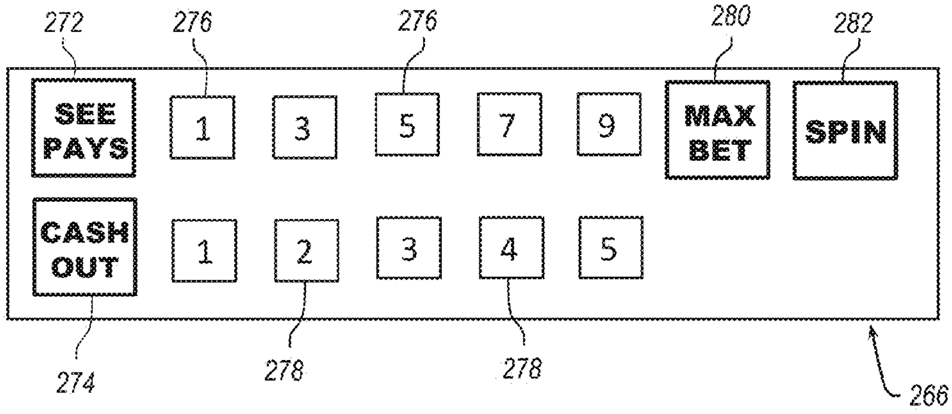
FIG. 21 is a schematic drawing of a control panel for the electronic gaming machine of FIG. 20.

FIG. 21 illustrates one possible embodiment of the control panel 266, which may be used where the electronic gaming machine 200 having a plurality of reels. The control panel 266 may include a "See Pays" button 272 that, when activated, causes the display unit 270 to generate one or more display screens showing the odds or payout information for the game or games provided by the electronic gaming machine 200. As used herein, the term "button" is intended to encompass any device that allows a player to make an input, such as an input device that must be depressed to make an input selection or a display area that a player may simply touch. The control panel 266 may include a "Cash Out" button 274 that may be activated when a player decides to terminate play on the electronic gaming machine 200, in which case the electronic gaming machine 200 may return value to the player, such as by returning a number of coins to the player via the payout tray 264.

The control panel 266 may be provided with a plurality of selection buttons 276, each of which allows the player to select a different number of pay lines prior to spinning the reels. For example, five buttons 276 may be provided, each of which may allow a player to select one, three, five, seven or nine pay lines.

The control panel 266 may also be provided with a plurality of selection buttons 78 each of which allows a player to specify a wager amount for each pay line selected. For example, the electronic gaming machine 200 may be provided with five selection buttons 78, each of which may allow a player to select 1¢, 2¢, 5¢, 10¢ and 20¢, to wager for each pay line selected. In that case, if a player were to activate one of the buttons 276 to select five pay lines and then activate one of the buttons 278 to select 5¢ per pay line to be wagered or bet, the total wager would be $0.25.

The control panel 266 may include a "Max Bet" button 280 to allow a player to make the maximum wager allowable for a game. In the above example, where up to nine pay lines were provided and up to 20¢ could be wagered for each pay line selected, the maximum wager would be $1.80 The control panel 266 may include a spin button 282 to allow the player to initiate spinning of the reels after a bet has been made.

In FIG. 21, a rectangle is shown around the buttons 272, 274, 276, 278, 280, 282. It should be understood that the rectangle simply designates, for ease of reference, an area in which the buttons 272, 274, 276, 278, 280, 282 may be located. Consequently, the term "control panel" should not be construed to imply that a panel or plate separate from the housing 250 of the electronic gaming machine 200 is required, and the term "control panel" may encompass a plurality or grouping of player activatable buttons.

Although one possible control panel 266 is described above, it should be understood that different buttons could be utilized in the control panel 266, and that the particular buttons used may depend on the game or games that could be played on the electronic gaming machine 200. Although the control panel 266 is shown to be separate from the display unit 270, it should be understood that the control panel 266 could be generated by the display unit 270. In that case, each of the buttons of the control panel 266 could be a coloured area generated by the display unit 270, and some type of mechanism may be associated with the display unit 270 to detect when each of the buttons was touched, such as a touch-sensitive screen.

As noted above, the electronic gaming machine 200 may include a mechanism by which the electronic gaming machine 200 may determine the identity of the player. In particular, the card reader 258 may be used to read a card that carries an identification code that may be uniquely associated with the player so that the gaming unit can differentiate that player from all other players, or so that the gaming unit can differentiate that player as a member of a group of players from all player not a member of the group of players. The electronic gaming machine 200 may also include equipment, such as a keypad 284, an input pad 286 (with optional stylus 287), a port (or antenna) 288 adapted to communicate via a wired or wireless link (infrared or radio frequency link, for example) to a mobile electronic device 290 (such as a personal digital assistant, smart phone or tablet), a camera 292, a scanner 294, a retinal (or iris) scanner 296, fingerprint scanner 297, and/or a microphone 298. The electronic gaming machine 200 may include any one of the devices 258, 284, 286, 288, 290, 292, 294, 296, 297, 298, or the electronic gaming machine 200 may include a combination of some or all of the devices 258, 284, 286, 287, 288, 290, 292, 294, 296, 297, 298.

In operation, a player may identify him or herself to the electronic gaming machine 200 by entering a unique numeric or alpha-numeric code using the key pad 284, for example. Alternatively, the player may use his or her finger or the stylus 287 to sign his or her signature on the input pad 286. As a further alternative, the player may sign his or her signature on the mobile electronic device 290, which signature is then converted to electronic data, and the data is then transferred via the port/antenna 288 to the electronic gaming machine 200. As yet another alternative, the player may sign his or her signature on a piece of paper that is then photographed using the camera 292 or scanned using the scanner 294 (or the bill acceptor 254) to convert the signature into electronic data. As an additional alternative, the player may place one of his or her fingers or his or her hand on the scanner 297, and the scanner 297 may generate an electronic data representation of the fingerprint on one or more of the player's fingers or an electronic data representation of the pattern of the entire hand. Alternatively, the camera 292 may be used to take a picture (live or still) of the player, the picture then being converted into electronic data. As a still further alternative, the player may place his or her eye up to the retinal (or iris) scanner 296, and the retinal (or iris) scanner 296 may generate an electronic data representation corresponding to the pattern of the retina (or iris) of the player. As yet another alternative, the player may speak into the microphone 298, and characteristics of the spoken words (or voiceprint) may be converted into an electronic data representation.

Figure 22:
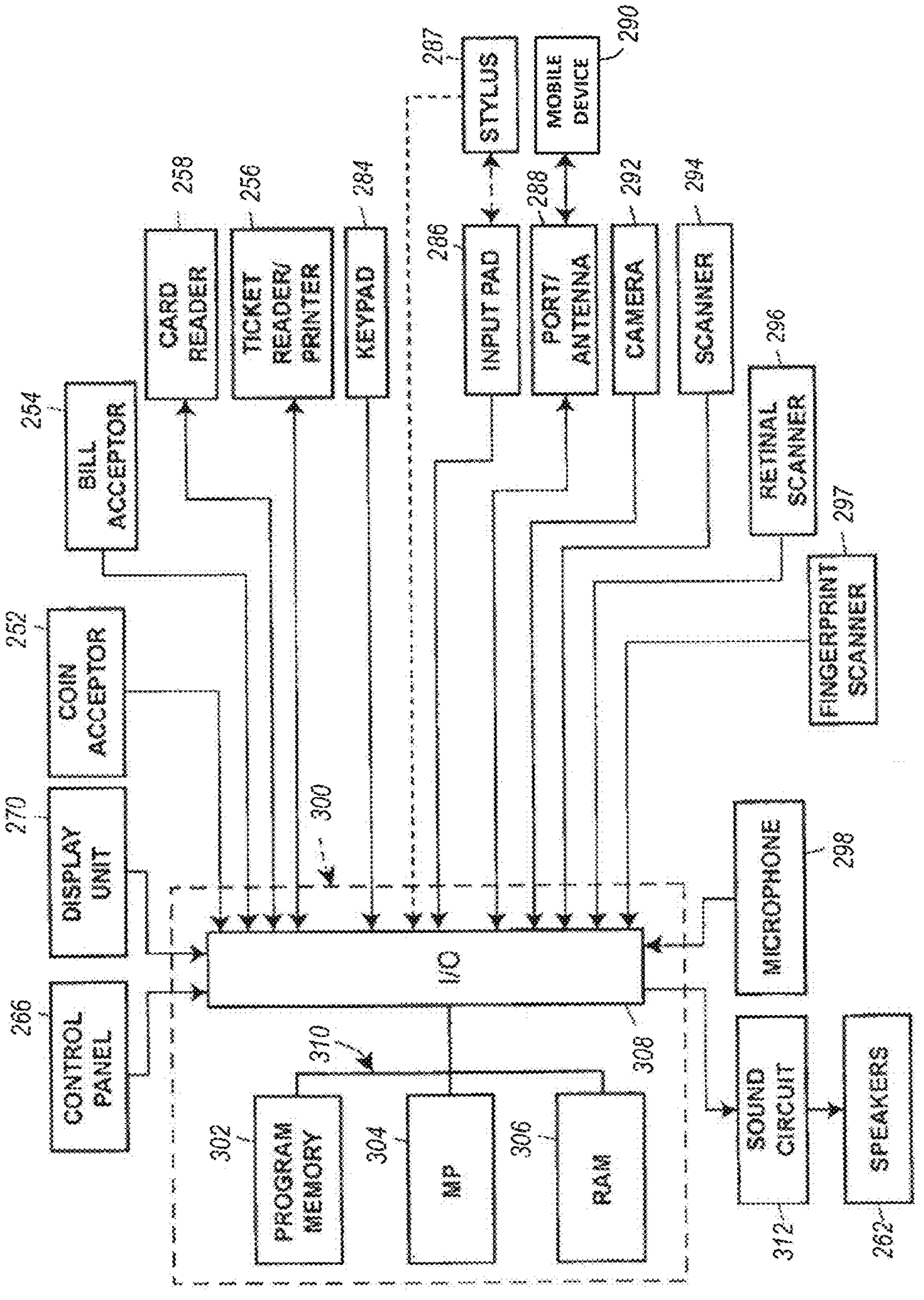
FIG. 22 is a block diagram of the electronic components of the electronic gaming machine of FIG. 20.

FIG. 22 is a block diagram of a number of components that may be incorporated in the electronic gaming machine 200. Referring to FIG. 22, the electronic gaming machine 200 may include a controller 300 that may comprise a program memory 302, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 300 may include multiple microprocessors 304. Similarly, the memory of the controller 300 may include multiple RAMs 306 and multiple program memories 302. Although the I/O circuit 108 is shown as a single block, it should be appreciated that the I/O circuit 308 may include a number of different types of I/O circuits. The RAM(s) 304 and program memories 302 may be implemented as semiconductor memories, magnetically readable memories, and/or optically readable memories, for example.

FIG. 22 illustrates that the coin acceptor 252, the bill acceptor 254, the ticket reader/printer 256, the card reader 258, the control panel 266, the display unit 270, the keypad 284, the input pad 286 (and optionally the stylus 287), the port/antenna 288, the digital camera 292, the scanner 294, the retinal scanner 296, the fingerprint scanner 297 and the microphone 298 may be operatively coupled to the I/O circuit 308, each of those components being so coupled by either a unidirectional or bidirectional, single-line or multiple-line data link, which may depend on the design of the component that is used. The speaker(s) 262 may be operatively coupled to a sound circuit 312, that may comprise a voice- and sound-synthesis circuit or that may comprise a driver circuit. The sound-generating circuit 312 may be coupled to the I/O circuit 308.

As shown in FIG. 22, the components 252, 254, 256, 258, 266, 270, 284, 286, 287, 288, 292, 294, 296, 297, 298, 312 may be connected to the I/O circuit 308 via a respective direct line or conductor. Different connection schemes could be used. For example, one or more of the components shown in FIG. 21 may be connected to the I/O circuit 308 via a common bus or other data link that is shared by a number of components. Furthermore, some of the components may be directly connected to the microprocessor 304 without passing through the I/O circuit 308.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like tablets and smart phones) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the electronic gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer programme configured to perform the invention. In this way the invention can be implemented in various ways on an electronic gaming machine. In a further aspect, the invention includes a gaming system configured comprising a central processing unit (such as a computer or computational processor) configured for communication with an electronic gaming machine to perform the invention. In a yet another aspect, the invention includes a non-transitory computer readable or carrier medium carrying computer executable code that, when executed on a central processing unit configured for communication with an electronic gaming machine, causes the central processing unit to perform the invention. In this case, the non-transitory carrier medium includes an external hard drive, a memory device, including a memory card, smart card, a radio frequency identification (RFID) device, USB key, magnetic card or other electronic storage device.

It will further be appreciated that any of the features in the preferred embodiments of the invention can be combined together and are not necessarily applied in isolation from each other. For example, the feature of the player being able to selectively starting or stopping spinning of the reels in the symbol positions 13, 33, 53 and the feature of providing separate video screens for the lower playing area 7*a* and upper display area 7*b* can be combined into a single electronic gaming machine 1. In another example, the feature of a progressive jackpot can be readily combined with the awarding a multiplier to the bonus prize for multiple displays of an associated bonus prize symbol. Similar combinations of two or more features from the above described embodiments or embodiments of the invention can be readily made by one skilled in the art.

By providing symbol positions that may or may not display game symbols and adding more symbol positions in response to the initial set of symbol positions displaying game symbols, the player's excitement is heightened as he or she anticipates the appearance of game symbols in the symbol positions to trigger more symbol positions that may increase the prize awarded. This increases player interest and encourages the player to continue playing the game. All these advantages of the invention result in the player being more likely to retain interest in continuing to play the same electronic gaming machine. Furthermore, since the electronic game controller controls operation of the electronic gaming machine, the invention can be readily implemented to existing gaming machines and other gaming systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An electronic gaming machine, comprising:

a display for displaying a game, wherein said game comprises game symbols and where predetermined winning combinations of said game symbols randomly selected in said game award prizes to a player; and an electronic game controller for controlling the display of said game symbols on said display; and a value transfer mechanism for receiving value from said player to make a bet and initiate play of said game on said display, the value transfer mechanism including at least one of a coin acceptor, a paper currency acceptor and a ticket reader;

wherein said electronic game controller in response to said player making a bet via said value transfer mechanism commences play of said game by randomly selecting game symbols and causing said display to display said randomly selected game symbols;

wherein said game further comprises an array of first symbol positions in which said game symbols are able to be displayed and said electronic game controller randomly determines whether to display one of said game symbols in each first symbol position; and wherein, in response to each first symbol position in said array displaying a game symbol, said electronic game controller causes the display of one or more second symbol positions in addition to said first symbol positions and randomly determines whether to display a game symbol in each of said one or more second symbol positions.

2. The electronic gaming machine of claim 1, said one or more second symbol positions are displayed on said display.

3. The electronic gaming machine of claim 2, wherein said one or more second symbol positions are displayed adjacent said array.

4. The electronic gaming machine of claim 2, wherein said one or more second symbol positions are displayed with said first symbol positions to form an extended array.

5. The electronic gaming machine of claim 2, wherein said one or more second symbol positions are displayed to form another array separate to said array.

6. The electronic gaming machine of claim 1, wherein said first symbol positions are arranged into rows and/or columns in said array, and the number of said second symbol positions displayed is equivalent to the number of symbol positions in one of said rows and/or columns.

7. The electronic gaming machine of claim 1, wherein said first symbol positions are arranged into reels in said array, and the number of said second symbol positions displayed is equivalent to the number of symbol positions in one of said reels.

8. The electronic gaming machine of claim 1, wherein said game awards prizes for predetermined winning combinations formed from said game symbols displayed in said first and second symbol positions.

9. The electronic gaming machine of claim 1, wherein each said second symbol position comprises a reel separate to the other second symbol positions.

10. The electronic gaming machine of claim 1, wherein, where said electronic game controller randomly determines that a game symbol does not appear in at least one of said first symbol positions, no game symbol is displayed in the at least one first symbol position and said game awards prizes for any predetermined winning combinations of the displayed game symbols in said array.

11. The electronic gaming machine of claim 1, wherein, where said electronic game controller randomly determines that a game symbol does not appear in at least one of said first symbol positions, a terminator symbol is displayed in the at least one first symbol position and said game awards prizes for any predetermined winning combinations of the displayed game symbols in said array.

12. The electronic gaming machine of claim 1, wherein, in response to said one or more second symbol positions each displaying a game symbol, said electronic game controller causes the display of one or more third symbol positions in addition to said first symbol positions and said second symbol positions, and said electronic game controller randomly determines whether to display a game symbol in each of said one or more third symbol positions.

13. The electronic gaming machine of claim 12, wherein said one or more third symbol positions are displayed on said display.

14. The electronic gaming machine of claim 13, wherein said one or more third symbol positions are displayed adjacent said array.

15. The electronic gaming machine of claim 13, wherein said one or more third symbol positions are displayed with said first symbol positions to form an extended array.

16. The electronic gaming machine of claim 13, wherein said one or more third symbol positions are displayed with said second symbol positions to form an extended array.

17. The electronic gaming machine of claim 13, wherein said one or more third symbol positions are displayed to form a further array separate to said array.

18. The electronic gaming machine of claim 12, wherein said first and second symbol positions are arranged into rows and/or columns in said array, and the number of said third symbol positions displayed is equivalent to the number of symbol positions in one of said rows and/or columns.

19. The electronic gaming machine of claim 12, wherein said first and second symbol positions are arranged into reels in said array, and the number of said third symbol positions displayed is equivalent to the number of symbol positions in one of said reels.

20. The electronic gaming machine of claim 12, wherein said game awards prizes for predetermined winning combinations of game symbols displayed in said first, second and third symbol positions.

21. The electronic gaming machine of claim 12, wherein, where said electronic game controller randomly determines that a game symbol does not appear in at least one of said second symbol positions, no game symbol is displayed in the at least one second symbol position and said game awards prizes for any predetermined winning combinations of game symbols displayed in said first and second symbol positions.

22. The electronic gaming machine of claim 12, wherein, where said electronic game controller randomly determines that a game symbol does not appear in at least one of said second symbol positions, a terminator symbol is displayed in the at least one second symbol position and said game awards prizes for any predetermined winning combinations of game symbols displayed in said first and second symbol positions.

23. The electronic gaming machine of claim 12, wherein a threshold number of game symbols displayed in said first, second and third symbol positions results in the award of a bonus prize of higher worth.

24. The electronic gaming machine of claim 23, wherein said threshold number of game symbols comprises a majority of the number of said first, second and third symbol positions in said array.

25. The electronic gaming machine of claim 1, wherein additional plays of said game are awarded as the number of said first symbol positions, second symbol positions and third symbol positions increase.

26. The electronic gaming machine of claim 1, wherein each said first symbol position comprises a reel separate to the other first symbol positions.

* * * * *